United States Patent [19]
Leibelt et al.

[11] Patent Number: 6,008,273
[45] Date of Patent: Dec. 28, 1999

[54] WATERBORNE COATING COMPOSITIONS FOR METAL CONTAINERS

[75] Inventors: Ulrich Leibelt, Tournus, France; Paul Böhler, Uetikon, Switzerland

[73] Assignee: The Dexter Corporation, Windsor Locks, Conn.

[21] Appl. No.: 08/853,782

[22] Filed: May 9, 1997

[51] Int. Cl.$^6$ ............................... C08K 3/20; C08L 63/02
[52] U.S. Cl. .................... 523/409; 523/411; 523/412
[58] Field of Search ..................... 523/409, 411, 523/412

[56] References Cited

U.S. PATENT DOCUMENTS

| | | | |
|---|---|---|---|
| 3,338,860 | 8/1967 | Vasta | 260/33.4 |
| 3,943,187 | 3/1976 | Wu | 260/837 R |
| 3,997,694 | 12/1976 | Wu | 428/35 |
| 4,021,396 | 5/1977 | Wu | 260/29.6 NR |
| 4,212,781 | 7/1980 | Evans et al. | 260/29.4 UA |
| 4,247,439 | 1/1981 | Matthews et al. | 260/29.6 NR |
| 4,302,373 | 11/1981 | Steinmetz | 260/29.3 |
| 4,308,185 | 12/1981 | Evans et al. | 260/29.2 EP |
| 4,355,122 | 10/1982 | Fan | 523/423 |
| 4,374,875 | 2/1983 | Fan | 427/386 |
| 4,444,923 | 4/1984 | McCarty | 523/406 |
| 4,446,258 | 5/1984 | Chu et al. | 523/406 |
| 4,446,260 | 5/1984 | Woods et al. | 523/409 |
| 4,480,058 | 10/1984 | Ting et al. | 523/404 |
| 4,585,813 | 4/1986 | Brown et al. | 523/409 |
| 4,638,038 | 1/1987 | Salensky | 525/533 |
| 4,683,273 | 7/1987 | Bode | 523/412 |
| 4,801,628 | 1/1989 | Ashing et al. | 523/412 |
| 4,897,434 | 1/1990 | Shimada et al. | 523/409 |
| 4,954,553 | 9/1990 | Johnson et al. | 524/376 |
| 4,963,602 | 10/1990 | Patel | 523/403 |
| 5,010,132 | 4/1991 | Morinaga et al. | 524/601 |
| 5,387,625 | 2/1995 | Parekh et al. | 523/404 |

FOREIGN PATENT DOCUMENTS

| | | | |
|---|---|---|---|
| 232021 | 12/1987 | European Pat. Off. | |
| 30 06 175 | of 0000 | Germany | C09D 3/80 |
| 0 071 429 | 9/1983 | WIPO | C09D 3/48 |

OTHER PUBLICATIONS

Woo et al., "Synthesis and characterization of water–reducible graft epoxy copolymers," vol. 54, No. 689, pp. 41–55 (1982).

Johnson et al., "Water–borne phenoxy resins low VOC coatings with excellent toughness, flexibility and adhesion," Water–Borne & Higher–Solids Coatings Symposium, Feb. 3–5, 1988, New Orleans, LA, pp. 443–461.

*Primary Examiner*—Robert Dawson
*Assistant Examiner*—D. Aylward
*Attorney, Agent, or Firm*—Marshall, O'Toole, Gerstein, Murray & Borun

[57] ABSTRACT

A waterborne coating composition for metal containers, a method of coating a metal container, and a metal article useful as a food or beverage container are disclosed. The waterborne coating compositions are thermoplastic and self-crosslinkable materials and comprise: (a) an epoxy resin; (b) a water-dispersible acrylic resin; (c) an optional solid filler; (d) a fugitive base; and an aqueous carrier, wherein the waterborne coating composition contains 450 grams or less of volatile organic compounds per kilogram of nonvolatile material.

19 Claims, No Drawings

WATERBORNE COATING COMPOSITIONS FOR METAL CONTAINERS

FIELD OF THE INVENTION

The present invention relates to waterborne coating compositions for metal containers that, after curing, demonstrate excellent adhesion and flexibility and do not adversely affect a food or beverage packaged in the metal container; to a method of coating a metal container; and to a metal article, like a metal can or container, having at least one surface coated with an adherent layer of the cured coating composition. The waterborne coating compositions are self-crosslinkable and comprise: (a) an epoxy resin; (b) a water-dispersible acrylic resin; (c) an optional solid filler, like a pigment; (d) a fugitive base; and an aqueous carrier, wherein the waterborne coating composition contains 450 g (grams) or less of volatile organic compounds (VOC) per kilogram (kg) of nonvolatile material (NVM).

BACKGROUND OF THE INVENTION

An aqueous solution in contact with an untreated metal substrate results in corrosion of the untreated metal substrate. Therefore, a metal article, such as a metal container for a water-based product, like a food or beverage, is rendered corrosion resistant in order to retard or eliminate interactions between the water-based product and the metal article. Generally, corrosion resistance is imparted to the metal article, or to a metal substrate in general, by passivating the metal substrate, or by coating the metal substrate with a corrosion-inhibiting coating.

Investigators continually seek improved coating compositions that: (a) have good barrier properties to reduce or eliminate corrosion of a metal article, and (b) do not adversely affect an aqueous product packaged in the metal article. For example, investigators have sought to improve the imperviousness of the coating in order to prevent corrosion-causing ions, oxygen molecules, and water molecules from contacting and interacting with a metal substrate. Imperviousness can be improved by providing a thicker, more flexible, and more adhesive coating, but often, improving one particular advantageous property is achieved at the expense of another advantageous property.

In addition, practical considerations limit the thickness, adhesive properties, and flexibility of a coating applied to a metal substrate. For example, thick coatings are expensive, require a longer cure time, can be esthetically unpleasing, and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Investigators also have sought coatings that possess chemical resistance in addition to corrosion inhibition. A useful coating for the interior of a metal container must withstand the solvating properties of a product packaged in the metal container. If the coating does not possess sufficient chemical resistance, components of the coating can be extracted into the packaged product and adversely affect the product. Even small amounts of extracted coating components can adversely affect sensitive products, like beer, by imparting an off-taste to the product.

Conventionally, organic solvent-based coating compositions were used to provide cured coatings having excellent chemical resistance. Such solvent-based compositions include ingredients that are inherently water insoluble, and thereby effectively resist the solvating properties of water-based products packaged in the metal container. However, because of environmental and toxicological concerns, and in order to comply with increasingly strict governmental regulations, an increasing number of coating compositions are water based. The water-based coating compositions include ingredients that are water soluble or water dispersible, and, therefore, cured coatings resulting from water-based coating compositions can be more susceptible to the solvating properties of water.

Epoxy-based-coatings and polyvinyl chloride-based coatings have been used to coat the interior of metal containers for foods and beverages because these coatings exhibit an acceptable combination of adhesion to a metal substrate, flexibility, chemical resistance, and corrosion inhibition. However, epoxy-based coatings and polyvinyl chloride-based coatings have serious disadvantages that investigators have not overcome.

Coatings based on polyvinyl chloride or related halide-containing vinyl polymers, like polyvinylidene chloride, possess the above-listed advantageous properties of chemical resistance and corrosion inhibition, and are economical. However, curing a polyvinyl chloride or related halide-containing vinyl polymer can generate toxic monomers, such as vinyl chloride, a known carcinogen. In addition, the disposal of a halide-containing vinyl polymer, such as by incineration, also can generate toxic monomers. The generated vinyl chloride thereby poses a potential danger to workers in metal can manufacturing plants, in food processing and packaging plants, and at disposal sites. Disposal of polyvinyl chloride and related polymers also can produce carcinogenic dioxins and environmentally harmful hydrochloric acid.

Government regulators, therefore, are acting to eliminate the use of polyvinyl chloride-based coating compositions that contact food, and thereby eliminate the environmental and health concerns associated with halide-containing vinyl polymers. Presently, however, polyvinyl chloride-based compositions are still high-volume coatings used to coat the interior of food and beverage containers.

To overcome these environmental concerns, epoxy-based coating compositions have been used to coat the interior of food and beverage containers. However, epoxy-based coatings also possess disadvantages. For example, epoxy-based coating compositions are more expensive than polyvinyl chloride-based coating compositions.

A greater disadvantage of epoxy-based coating compositions is the presence of relatively high amounts of a crosslinking agent, such as a phenolic resin or an aminoplast in the composition. Phenolic resins and aminoplasts typically are condensates of formaldehyde with a phenol, a urea, a melamine, or benzoguanamine. Both types of crosslinking agents include free residual formaldehyde or generate free formaldehyde during cure of the epoxy-based composition. The amount of free formaldehyde often is sufficient to adversely affect the taste of various products packaged in a container coated with a cured epoxy-based composition. For example, a product such as beer is very sensitive to low concentrations of free formaldehyde, and taste of the beer is adversely affected. In addition, free formaldehyde poses a health hazard in the work place. Presently, strict exposure limits are set to protect workers from exposure to formaldehyde.

Various patents and publications disclose waterborne coating compositions for metal cans. In general, prior patents disclose coating compositions including waterborne thermoset resins for use as can coatings. The thermoset resins are formulated with a crosslinking agent to provide crosslinked films during cure, as demonstrated by the resistance of the cured coating to the effects of organic solvents such as methyl ethyl ketone. These waterborne resins include significant amounts of organic solvents, i.e., have a high VOC. The organic solvents often are essential to help emulsify the thermoset resin and to improve emulsion stability. The presence of organic solvents in a coating composition also improve film coalescence, film flow-out, and substrate wetting.

Waterborne phenoxy resins having a low VOC have been disclosed. These waterborne phenoxy resins are high molecular weight thermoplastic resins that are difficult to process and are too expensive for practical commercial use. In addition, because these phenoxy resins are thermoplastic resins, cured coatings derived therefrom are not resistant to organic solvents, although the cured coatings often provide sufficient barrier properties to water-based compositions for use as can coatings.

Investigators, therefore, have sought a waterborne coating composition for the interior of food and beverage containers that retains the advantageous properties of adhesion, flexibility, chemical resistance, and corrosion inhibition, and that is economical and does not adversely affect the taste or other esthetic properties of sensitive food and beverages packaged in the container. Investigators especially have sought a waterborne coating composition that demonstrates these advantageous properties and also reduces the environmental and toxicological concerns associated with organic solvents.

Investigators prefer a thermosetting coating composition because such compositions are easier to handle, require a lower VOC, and provide better chemical resistance than thermoplastic coating compositions. A thermosetting coating composition, however, typically requires the presence of a crosslinking agent in order to provide a cured coating having a sufficient molecular weight. Generally, the crosslinking agent is a phenolic resin, an aminoplast or a similar resin. Therefore, investigators have sought a low VOC coating composition for food and beverage containers (1) that meets increasingly strict environmental regulations, i.e., has a low VOC and is free of a formaldehyde-containing crosslinking agent, and (2) has corrosion inhibition properties at least equal to existing organic solvent-based or high VOC coating compositions. Such a waterborne coating composition would satisfy a long felt need in the art.

A present waterborne coating composition comprises an epoxy resin, a water-dispersible acrylic resin, an optional solid filler, and a fugitive base. A present waterborne coating composition is self-crosslinkable, and, therefore, is free of a crosslinking agent, like a phenolic resin or an aminoplast. Accordingly, the waterborne coating compositions can be used as a can coating composition for taste-sensitive products, like beer. A present waterborne coating composition contains 450 g or less VOC/kg NVM, yet demonstrates excellent storage stability, composition flow out, substrate wetting, and cured coating properties, such as adhesion, hardness and flexibility.

A waterborne coating composition of the present invention has a very low VOC, and substantially overcomes the environmental and toxicological problems associated with an organic solvent-based coating composition or a high VOC coating composition (i.e., a composition containing greater than 450 g VOC/kg NVM). A present waterborne coating composition also is free of a crosslinking agent, like a phenolic resin or an aminoplast, thereby eliminating the environmental and toxicological concerns associated with formaldehyde, and eliminating an ingredient that can adversely affect the taste of a food or beverage that contacts the cured coating composition.

Prior investigators have studied waterborne epoxy resin-based compositions for application to metal substrates. Many of these investigators sought epoxy resin-based aqueous compositions that provide a sufficiently flexible cured coating such that the coated metal substrate can be deformed without destroying film continuity. Often, conventional epoxy resins provide a rigid cured film thereby making it difficult to impossible to coat the metal substrate prior to deforming, i.e., shaping, the metal substrate into a metal article, like a metal can. Coating a metal substrate prior to shaping the metal substrate is the present standard industrial practice.

For example, Johnson et al. U.S. Pat. No. 4,954,553 discloses an aqueous coating composition comprising a carboxyl-bearing phenoxy resin and a resin that is soft in comparison to the phenoxy resin, like a polyester. The carboxyl-bearing phenoxy resin is prepared by grafting ethylenically unsaturated monomers to the phenoxy resin. The coating composition provides flexible cured coatings. Fan U.S. Pat. Nos. 4,355,122 and 4,374,875 disclose a waterborne phenoxy composition wherein an ethylenically unsaturated monomer including a carboxyl group is grafted onto a phenoxy resin by standard free radical polymerization techniques, then the carboxyl groups are neutralized by a base.

Chu et al. U.S. Pat. No. 4,446,258 discloses an aqueous coating composition comprising: (1) the neutralized reaction product of an epoxy resin with a preformed addition polymer containing carboxyl groups, and (2) an acrylic or vinyl polymer, which is prepared either in situ or added to the composition, and which is different from the preformed addition polymer. Evans et al. U.S. Pat. Nos. 4,212,781 and 4,308,185 disclose grafting an acrylic monomer or monomer blend to an epoxy resin to provide a polymeric blend including unreacted epoxy resin, an acrylic resin and a graft polymer of the acrylic resin and epoxy resin. Steinmetz U.S. Pat. No. 4,302,373 discloses a waterborne coating composition consisting essentially of the neutralized reaction product of a modified polyepoxide (e.g., an ester or ether) and a carboxyl-functional polymer.

Patel U.S. Pat. No. 4,963,602 discloses aqueous coating compositions including an epoxy resin, an acrylic resin, a phenoxy resin, a novolac resin, and a resol resin. Wu U.S. Pat. Nos. 3,943,187 and 3,997,694 disclose coating compositions consisting essentially of a blend of an acrylic polymer having hard and soft segments and an epoxy resin. Wu U.S. Pat. No. 4,021,396 discloses an aqueous coating composition containing an acrylic polymer having at least two reactive sites per chain and an epoxy resin having an epoxy group in combination with at least one hydroxyl or epoxy group. Salensky U.S. Pat. No. 4,638,038 discloses modified phenoxy resins wherein anhydrides or polycarboxylic acids are grafted onto a phenoxy resin. Morinaga et al. U.S. Pat. No. 5,010,132 discloses a coating composition for a metal can comprising: (1) fine particles of a polyester resin including terephthalic acid and isophthalic acid, and (2) a surfactant.

Other patents disclosing coating compositions including an epoxy resin and an acrylic resin include Matthews et al. U.S. Pat. No. 4,234,439; Parekh et al. U.S. Pat. No. 5,387,625; McCarty U.S. Pat. No. 4,444,923; Ting et al. U.S. Pat.

No. 4,480,058; Brown et al. U.S. Pat. No. 4,585,813; and Vasta U.S. Pat. No. 3,338,860.

Publications disclosing a water-based coating compositions including an epoxy resin and an acrylic resin are:

J. T. K. Woo et al., "Synthesis and Characterization of Water-Reducible Graft Epoxy Copolymers," *J. Coat. Tech.*, 54 (1982), pp. 41–55; and R. N. Johnson et al., "Water-Borne Phenoxy Resins Low VOC Coatings with Excellent Toughness, Flexibility and Adhesion," presented at the Water-Borne and Higher-Solid Coatings Symposium, Feb. 3–5, 1988 in New Orleans, La.

Although the above-identified patents and publications disclose coating compositions for the interior of a food or beverage container, the patents and publications do not disclose a self-crosslinkable, low VOC waterborne coating composition that is free of a phenolic or an aminoplast crosslinking agent, and which, after curing, demonstrates: (1) excellent flexibility; (2) excellent adhesion; (3) excellent chemical resistance and corrosion inhibition; and (4) reduced environmental and toxicological concerns.

As an added advantage, it is envisioned that a present waterborne coating composition can be used both on can ends and on can bodies, thereby obviating the use of two different coating compositions by container manufacturers. Furthermore, a present waterborne coating composition exhibits sufficient clarity, hardness, and mar resistance after curing for use as a coating on the exterior of a metal container. Accordingly, because of improved chemical and physical properties, and because of the wide range of cure temperatures, a waterborne coating composition of the present invention has a more universal range of applications, such as for the interior coating of a metal container for food or beverage products or for the exterior coating of a metal container; overcomes the environmental and toxicological concerns associated with a solvent-based or a high VOC coating composition; and overcomes disadvantages, such as adversely affecting the taste of a beverage, presented by prior epoxy-based coatings that contained a phenolic resin or an aminoplast crosslinking agent.

SUMMARY OF THE INVENTION

The present invention is directed to waterborne coating compositions that, after curing, effectively inhibit corrosion of a metal substrate; do not adversely affect products packaged in a container having an interior surface coated with the cured composition; and exhibit excellent flexibility, chemical resistance, and adhesion. A waterborne coating composition of the present invention can be used both on can ends and can bodies, and on container interiors and exteriors. The waterborne coating compositions effectively inhibit corrosion of ferrous and nonferrous metal substrates when a composition is applied to a surface of the metal substrate, then cured for a sufficient time and at a sufficient temperature to provide a crosslinked coating. The waterborne coating compositions also are self-crosslinking and, therefore, are free of a phenolic resin or an aminoplast crosslinking agent. However, a cured and crosslinked coating nevertheless demonstrates sufficient chemical and physical properties for use on the interior of containers used to package foods and beverages.

The present waterborne coating compositions overcome numerous disadvantages associated with prior epoxy resin-based compositions, and comprise: (a) an epoxy resin; (b) a water-dispersible acrylic resin; (c) an optional solid filler; (d) a fugitive base; and a carrier comprising water and volatile organic solvents. A waterborne coating composition contains 450 g or less VOC/kg NVM, and the waterborne coating composition is free of a phenolic resin or an aminoplast crosslinking agent. The VOC of the composition is measured on a minus water basis. Therefore, the VOC is determined by subtracting the water content from the composition, then determining the VOC (in g VOC/kg NVM) of the composition.

In particular, a present waterborne coating composition comprises: (a) about 50W to about 90%, by weight of nonvolatile material, of an epoxy resin having an epoxy equivalent weight (EEW) of about 5,000 to about 12,000, and preferably about 5,500 to about 10,000; (b) about 10% to about 50%, by weight of nonvolatile material, of a water-dispersible acrylic resin comprising an $\alpha,\beta$-unsaturated carboxylic acid and an $\alpha,\beta$-unsaturated ester; (c) 0% to about 30%, by weight of nonvolatile material, of an optional solid filler, like a pigment; and (d) a fugitive base, like a tertiary amine, in an amount sufficient to neutralize about 20% to about 200% of the stoichiometric amount of the carboxylic acid groups of the acrylic resin, in an aqueous carrier. A present waterborne coating composition is self-crosslinking and, therefore, is free of a formaldehyde-containing crosslinking agent, like an anhydride, a phenolic resin, or an aminoplast. The water-dispersible acrylic resin typically is a copolymer including, for example, acrylic acid, methacrylic acid, a $C_2-C_{12}$ alkyl acrylate, a $C_2-C_{12}$ alkyl methacrylate, styrene, ethylene, and similar vinyl monomers.

A waterborne coating composition of the present invention has a low VOC, i.e., contains 450 g or less VOC/kg NVM. Accordingly, toxicological and environmental problems associated with the coating compositions are minimized. A waterborne coating composition of the present invention is a stable composition even though the VOC is very low in comparison to prior compositions, and the composition exhibits sufficient film coalescence, film flow out, and substrate wetting to successfully coat a metal substrate.

A present waterborne coating composition is free of a phenolic resin and an aminoplast that conventionally are used to crosslink epoxy-based compositions. As used here and hereinafter, the term "free of an anhydride, a phenolic resin, and an aminoplast" is defined as a composition including 0% to about 0.05%, and preferably 0% to about 0.02%, by weight of nonvolatile material, of an anhydride, a phenolic resin, an aminoplast, a similar formaldehyde-containing crosslinking agent, such as carbodiimide compounds, melamine resins, urea resins, or urea-formaldehyde compounds, or mixtures thereof. At this level, the anhydride, phenolic resin, aminoplast, or similar formaldehyde-containing crosslinking agent does not adversely affect a waterborne coating composition, or a cured coating resulting therefrom, and does not adversely affect a product, like a food or beverage, that contacts the cured coating.

Components (a) through (d) are dispersed in an aqueous carrier such that a waterborne coating composition includes about 10% to about 60%, and preferably about 15% to about 50%, by weight of the total composition, of nonvolatile components. To achieve the full advantage of the present invention, a waterborne coating composition includes about 20% to about 50%, by weight of the total composition, of nonvolatile components. Other optional components, such as an additive to enhance composition esthetics or performance, also can be included in the composition, and accordingly increase the weight percent of total nonvolatile material in the composition to above about 60% by weight of the total waterborne coating composition. A waterborne coating composition also can include up to 450 g VOC/kg NVM to assist in dispersing or emulsifying composition ingredients or to improve application of the waterborne coating composition to a substrate. A waterborne coating composition of the present invention typically includes about 420 g VOC to about 450 g VOC per kg NVM.

As used here and hereinafter, the term "waterborne coating composition" is defined as a coating composition including an epoxy resin; a water-dispersible acrylic resin; an optional solid filler; a fugitive base; and any other optional ingredients dispersed in the aqueous carrier. The term "cured coating composition" is defined as an adherent polymeric coating resulting from curing a waterborne coating composition.

Therefore, one important aspect of the present invention is to provide a waterborne coating composition that effectively inhibits the corrosion of ferrous and nonferrous metal substrates and that has a low VOC. A waterborne coating composition, after application to a metal substrate, and subsequent curing at a sufficient temperature for a sufficient time, provides an adherent layer of a cured coating composition that effectively inhibits corrosion; exhibits excellent flexibility and adhesion to the metal substrate; and does not adversely affect a product, like a food or beverage, that contacts the cured coating composition. Because of these advantageous properties, a cured coating composition can be used to coat the interior of food and beverage containers and overcome the disadvantages associated with conventional polyvinyl chloride-based compositions and epoxy-based compositions. A cured coating composition comprises the epoxy resin, the acrylic resin, and the optional solid filler, essentially in the amounts these ingredients are present in the waterborne coating composition, expressed as nonvolatile material. The fugitive base is expelled from a waterborne coating composition during the cure cycle.

In accordance with another important aspect of the present invention, a cured coating composition demonstrates excellent flexibility and adhesion to a metal substrate even in the absence of a phenolic resin or aminoplast. The excellent adhesion of a cured coating composition to a metal substrate improves the barrier and corrosion-inhibiting properties of the coating composition. The excellent flexibility of a cured coating composition facilitates processing of the coated metal substrate into a coated metal article, like in molding or stamping process steps, such that the cured coating composition remains in continuous and intimate contact with the metal substrate. A cured coating composition exhibits excellent chemical resistance and does not adversely affect a food or beverage packaged in a container having an interior surface coated with the cured coating composition. A cured coating composition is sufficiently hard to resist scratching, even when cured at a temperature as low as about 350° F. (176° C.).

In accordance with yet another important aspect of the present invention, the waterborne coating compositions provide a cured coating composition that overcomes the disadvantages of prior epoxy-based coatings and of conventional polyvinyl chloride-based coatings used to coat the interior of containers for food and beverages. A present waterborne coating composition has a low VOC and, therefore, overcomes the health and environmental concerns associated with prior coating compositions including high VOC. A cured coating composition of the present invention also overcomes the adverse taste imparted to packaged foods and beverages by prior epoxy-based compositions which include high percentages of a phenolic resin or an aminoplast crosslinking agent. In addition, a present waterborne coating composition can be used both on the interior and exterior of can bodies and can ends, thereby obviating the need for a container manufacturer to use multiple coating compositions.

These and other aspects and advantages of the present invention will become apparent from the following detailed description of the preferred embodiments.

DETAILED DESCRIPTION OF THE PREFERRED EMBODIMENTS

A waterborne coating composition of the present invention, after curing, provides a cured coating composition that effectively inhibits the corrosion of metal substrates, such as, but not limited to, aluminum, iron, steel and copper. A waterborne coating composition, after curing, also demonstrates excellent adhesion to the metal substrate; excellent chemical resistance and scratch resistance; and excellent flexibility. A cured coating composition does not impart a taste to foods or beverages that contact the cured coating composition.

In general, a present waterborne coating composition comprises: (a) an epoxy resin; (b) a water-dispersible acrylic resin comprising an $\alpha,\beta$-unsaturated carboxylic acid and an $\alpha,\beta$-unsaturated ester, like a $C_2$–$C_{12}$ alkyl acrylate or a $C_2$–$C_{12}$ alkyl methacrylate; (c) an optional solid filler; and (d) a fugitive base, in (e) an aqueous carrier. The waterborne coating compositions are self-crosslinking and are free of a phenolic resin or an aminoplast crosslinking agent, i.e., the compositions contain 0% to about 0.05%, preferably 0% to about 0.02%, by weight of nonvolatile material, of a phenolic resin, an aminoplast, or a related formaldehyde-containing crosslinking agent. The waterborne coating compositions of the present invention also are low VOC compositions, i.e., containing 450 g or less VOC/kg NVM. In addition, a present waterborne coating composition can include additional optional ingredients that improve the esthetics of the composition, that facilitate processing of the composition, or that improve a functional property of the composition. The individual composition ingredients are described in more detail below.

(a) Epoxy Resin

In accordance with an important feature of the present invention, the waterborne coating compositions contain an epoxy resin in an amount of about 50% to about 90%, by weight of nonvolatile material. Preferably, the waterborne compositions contain about 55% to about 85% of an epoxy resin, by weight of nonvolatile material. To achieve the full advantage of the present invention, the waterborne coating compositions contain about 60% to about 85% of an epoxy resin, by weight of nonvolatile material.

The epoxy resin has an EEW of about 5,000 to about 12,000, and preferably, about 5,500 to about 10,000. To achieve the full advantage of the present invention, the epoxy resin has an EEW of about 6,000 to about 9,000. The epoxy resin, therefore, has a weight average molecular weight($M_w$) of about 10,000 to about 25,000, and preferably about 12,000 to about 20,000; and a number average molecular weight ($M_n$) of about 2,500 to about 10,000, preferably about 3,000 to about 10,000.

The epoxy resin contains an average of about 1.5 to about 2.5 epoxy groups per molecule of epoxy resin. If the average number of epoxy groups exceeds about 2.5, excessive crosslinking of the composition can result in a cured coating that is too hard or brittle. The epoxy resin imparts chemical and mar resistance to the cured coating composition. If the epoxy resin is present in an amount below about 50% by weight of nonvolatile material of the coating composition, then crosslinkable moieties are present in an insufficient amount to achieve proper cure of the coating. If the epoxy resin is present in an amount above about 90% by weight of nonvolatile material of the coating composition, then the cured coating composition does not have sufficient flow and wetting properties. Within the above weight ranges for the epoxy resin, the cured coating composition is sufficiently flexible to permit deformation of a cured coating composition without forming cracks, and is sufficiently hard to exhibit excellent chemical and mar resistance.

The epoxy resin typically is a linear epoxy resin terminated at each molecular end of the resin with an epoxy group. The epoxy compounds have about two epoxy groups, i.e., an average about 1.5 to about 2.5 epoxy groups per molecule of epoxy resin.

The epoxy resin can be an aliphatic epoxy resin or an aromatic epoxy resin. The preferred epoxy resins are aromatic, like epoxy resins based on the diglycidyl ether of bisphenol A. The epoxy resin can be used in its commercially available form, or can be prepared by advancing a low molecular weight epoxy resin by standard methods well known to those skilled in the art, e.g., advancing an epoxy resin having an EEW of about 180 to about 1,000 with bisphenol A to produce an epoxy resin having an EEW of about 5,000 to about 12,000.

Examples of useful epoxy resins include, but are not limited to, DER 664, DER 667, DER 668, and DER 669, all available from Dow Chemical Co., Midland, Mich., and EPON 1004, EPON 1007, and EPON 1009, all available from Shell Chemical Co., Houston, Tex. An exemplary low molecular weight epoxy resin that can be advanced with bisphenol A is EPON 828, available from Shell Chemical Co.

In general, suitable epoxy resins are aliphatic-, cycloaliphatic-, or aromatic-based epoxy resins, such as, for example, epoxy resins represented by structural formulae I and II:

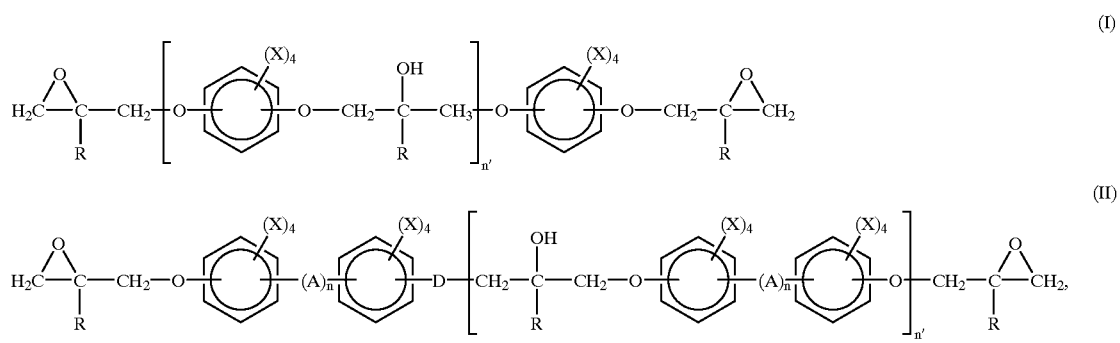

wherein each A is, independently, a divalent hydrocarbyl group having 1 to about 12, preferably 1 to about 6, and most preferably 1 to about 4, carbon atoms; each R is, independently, hydrogen or an alkyl group having 1 to about 3 carbon atoms; each X is, independently, hydrogen, a hydrocarbyl or hydrocarbyloxy group having 1 to about 12, preferably 1 to about 6, and most preferably 1 to about 4, carbon atoms, or a halogen atom, preferably chlorine or bromine; n is 0 or 1, and n' has an average value of 0 to about 125, preferably 0 to about 100, and most preferably 0 to about 75.

In particular, preferred epoxy resins are the (diglycidyl ether/bisphenol-A) resins, i.e., polyether diepoxides prepared by the polymeric adduction of bisphenol-A (III)

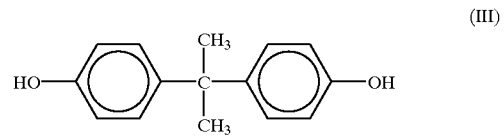

and the diglycidyl ether of bisphenol-A (IV).

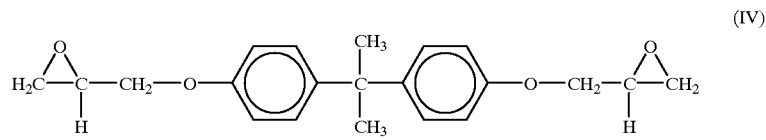

The diglycidyl ether can be preformed by reacting two molecules of epichlorohydrin with one molecule of the bisphenol-A in the presence of a base, such as sodium hydroxide. Preferably, however, this reaction is carried out in such a manner that the resulting diglycidyl ether molecules react in situ with bisphenol molecules to produce the epoxy resin.

In this case, the epoxy resin is a mixture including polymeric species corresponding to different values of n' in the following idealized formula V:

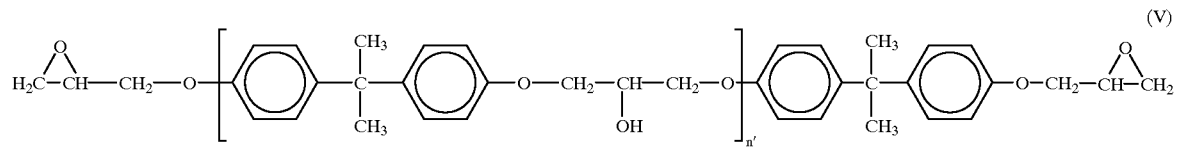

wherein n' is a number from 0 to about 125.

In addition to bisphenol-A, useful epoxy resins can be prepared by advancing a diglycidyl ether of a bisphenol listed below with an exemplary, but nonlimiting, bisphenol listed below:

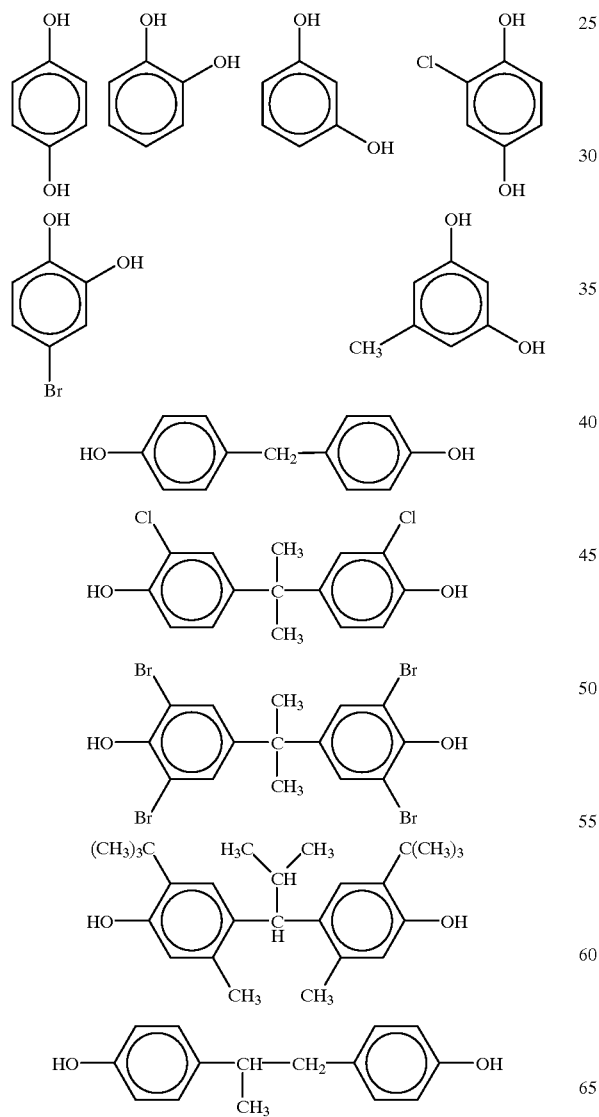

-continued

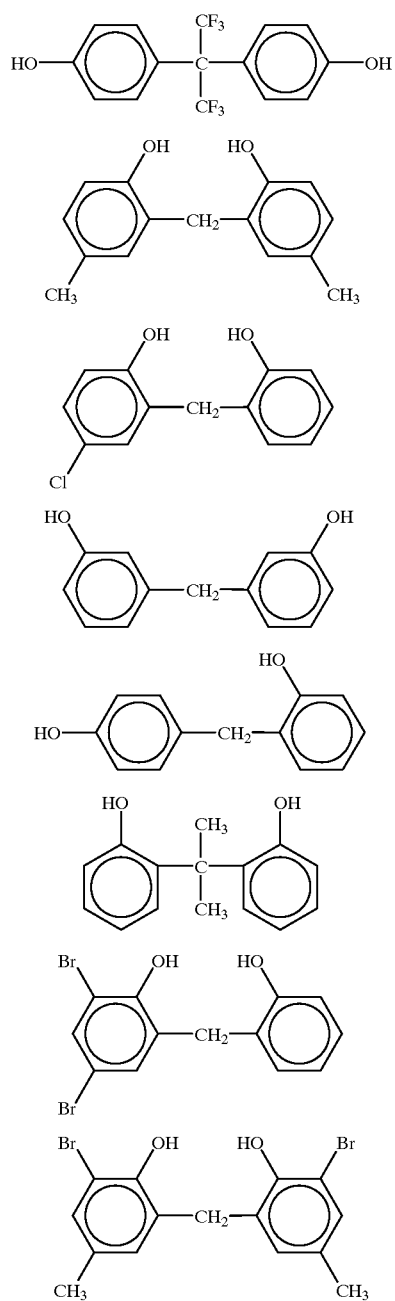

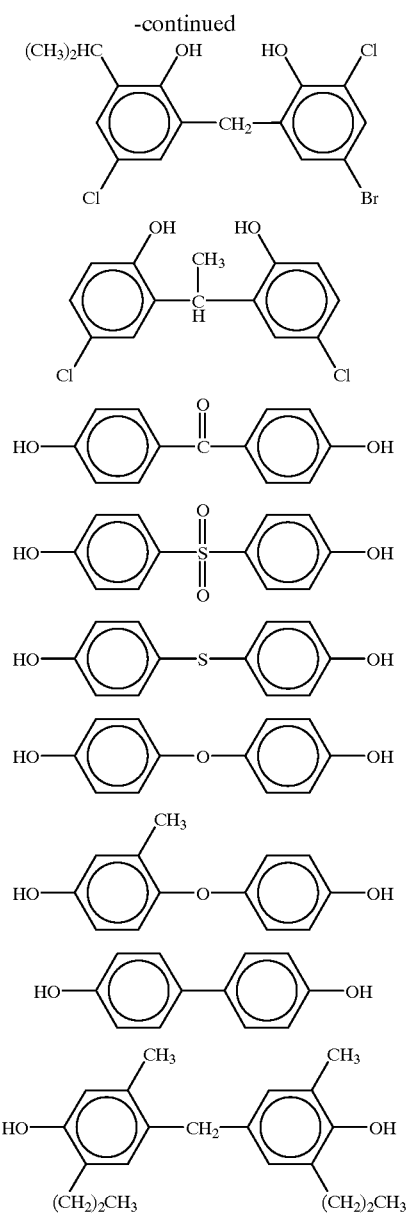

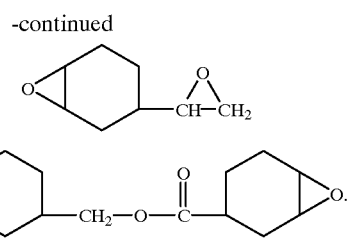

(c) Acrylic Resin

In addition to an epoxy resin, the waterborne coating compositions also contain about 10% to about 50%, and preferably about 15% to about 45%, by weight of nonvolatile material, of a water-dispersible acrylic resin. To achieve the full advantage of the present invention, a waterborne coating compositions contain about 15% to about 35% by weight of nonvolatile material, of the water-dispersible acrylic resin. The acrylic resin comprises an α,β-unsaturated carboxylic acid and an α,β-unsaturated ester, like a $C_2$–$C_{12}$ alkyl acrylate, a $C_2$–$C_{12}$ alkyl methacrylate, or a mixture thereof. The acrylics provide additional crosslinking sites, and in addition provides a more flexible cured coating composition.

The acrylic resin has about 3.5 to about 10 milliequivalents (meq) of carboxylic acid groups per gram (g) of the resin. Alternatively stated, the acrylic resin is prepared from a monomer mixture containing about 25% to about 75%, and preferably about 30% to about 70%, by weight of an α,β-unsaturated carboxylic acid, like acrylic acid or methacrylic acid. The acrylic resin, therefore, has pendant carboxylic acid groups. As demonstrated more fully hereafter, the acrylic resin is prepared by conventional free radical polymerization processes during the preparation of a waterborne coating composition of the present invention. Alternatively, the acrylic resin can be prepared, then added to a waterborne coating composition of the present invention.

In accordance with an important feature of the present invention, the α,β-unsaturated carboxylic acid monomers are capable of rendering the acrylic resin dispersible in water. These monomers yield either water-soluble or water-dispersible copolymers that are solubilized or dispersed in water by neutralization with a base. Suitable α,β-unsaturated carboxylic acid monomers include, for example, but are not limited to, acrylic acid, methacrylic acid, crotonic acid, itaconic acid, maleic acid, mesaconic acid, citraconic acid, fumaric acid, and mixtures thereof.

In accordance with another important feature of the present invention, the acrylic resin contains an α,β-unsaturated ester, typically an ester of an α,β-unsaturated acid, particularly acrylic acid or methacrylic acid. The ester is prepared from an α,β-unsaturated acid and an alcohol having two ($C_2$) to twelve ($C_{12}$) carbon atoms. As used here and throughout the specification, the term "$C_2$–$C_{12}$ alkyl" is defined as a group containing two to twelve carbon atoms which can further be substituted with halo, hydroxy, or amino groups.

Examples of useful α,β-unsaturated esters are $C_2$–$C_{12}$ alkyl acrylates, $C_2$–$C_{12}$ alkyl methacrylates, and $C_2$–$C_{12}$ crotonates, like the ethyl, propyl, isopropyl, butyl, isobutyl, pentyl, isoamyl, hexyl, ethylhexyl and lauryl acrylates, methacrylates and crotonates. Other examples include amino and hydroxy-substituted $C_2$–$C_{12}$ alkyl acrylates, methacrylates, and crotonates. It is also envisioned that diesters of α,β-unsaturated dicarboxylic acids, like dibutyl fumarate, can be used in conjunction with, or as a substitute Other epoxy resins that can be used as a component of the water-dispersible polymer are prepared from the following starting epoxy-containing materials. These epoxy-containing materials are reacted with bisphenol-A or another bisphenol to adjust the molecular weight of the epoxy resin to a sufficiently high range.

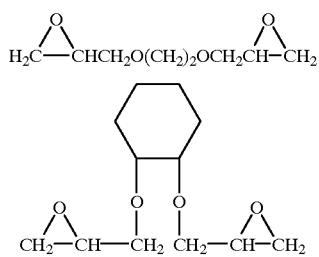

for, the $C_2$–$C_{12}$ alkyl acrylate, methacrylate, or crotonate. The α,β-unsaturated ester is present in an amount of about 10% to about 60%, and preferably about 20% to about 50%, by weight of the monomer mixture used to prepare the acrylic resin.

The α,β-unsaturated carboxylic acid and α,β-unsaturated ester conventionally are copolymerized with a vinyl or an additional acrylic monomer, like styrene or ethylene. The acrylic monomers can include 0% up to about 65%, by total weight of monomers, of vinyl monomers. To avoid excessive branching, the amount of polyvinyl monomers is 0% to about 3% by total weight of monomers.

Polymerizable vinyl and acrylic monomers suitable for copolymerization with the α,β-unsaturated carboxylic acid and α,β-unsaturated ester include, for example, aromatic and aliphatic compounds including vinyl moieties and amides of α,β-unsaturated carboxylic acids. Nonlimiting examples of suitable vinyl monomers include styrene and halostyrenes; isoprene; conjugated butadiene; α-methylstyrene; vinyl toluene; vinyl naphthalene; and mixtures thereof. Other suitable polymerizable vinyl monomers include vinyl chloride, acrylonitrile, acrylamide, methacrylamide, methacrylonitrile, vinyl acetate, vinyl propionate, vinyl stearate, isobutoxymethyl acrylamide, and the like.

The preferred monomers present in the water-dispersible acrylic resin are ethyl acrylate, butyl acrylate, hydroxyethyl acrylate, hydroxyethyl methacrylate, acrylic acid, methacrylic acid, styrene, methyl acrylate, methyl methacrylate, and mixtures thereof. The most preferred monomers of the acrylic resin are methacrylic acid, acrylic acid, butyl acrylate, styrene, hydroxyethyl acrylate, hydroxyethyl methacrylate, and mixtures thereof.

If a water-dispersible acrylic resin is prepared during the preparation of a waterborne coating composition, a free radical initiator also is present. Useful free radical initiators include, but are not limited to, redox initiators, peroxide-type catalysts, like, for example, cumene hydroperoxide, or azo compounds, like, for example, azobisisobutyronitrile. Preferably, the free radical initiator is a peroxide-type catalyst.

In general, any free radical initiator can be used in preparing the water-dispersible acrylic resin. One commonly used, and preferred, free radical initiator is potassium persulfate. In addition to potassium persulfate, other useful free radical polymerization catalysts include, but are not limited to, redox initiators, such as a sulfite or bisulfite of an alkali metal, ammonium sulfite, ammonium metabisulfate, ammonium bisulfite, a persulfate of an alkali metal or ammonium persulfate; a peroxy compound, such as a peroxide or a peroxy acid, like t-butyl hydroperoxide, di-t-butyl hydroperoxide, benzoyl hydroperoxide, t-butyl peroxide, lauroyl peroxide, methyl ethyl ketone peroxide, chlorobenzoyl peroxide, t-butyl perbenzoate, t-butyl peroxy isopropyl carbonate, and peroxy-3,3,5-trimethylcyclohexane, or a mixture thereof.

Also useful are free radical thermal initiators such as azobisisobutyronitrile; 4-t-butylazo-4'-cyanovaleric acid; 4,4'-azobis(4-cyanovaleric acid); 2,2'-azobis(2-amidinopropane)dihydrochloride; 2,2'-azobis(2,4-dimethylvaleronitrile); dimethyl 2,2'-azobisisobutyrate; 2,2'-azodimethyl bis(2,4-dimethylvaleronitrile); (1-phenylethyl)azodiphenylmethane; 2,2'-azobis(2-methylbutyronitrile); 1,1'-azobis(1-cyclohexanecarbonitrile); 2-(carbamoylazo)-isobutyronitrile; 2,2'-azobis(2,4,4-trimethylpenta-2-phenylazo- 2,4-dimethyl-4-methoxy)valeronitrile; 2,2'-azobis(2-methylpropane); 2,2'-azobis(N,N'dimethyleneisobutyramidine)dihydrochloride; 4,4'-azobis (4-cyanopentanoic acid); 2,2'-azobis(2-methyl-N-[1,1-bis-(hydroxymethyl)-2-hydroxyethyl]propionamide); 2,2'-azobis(2-methyl-N-[1,1-bis(hydroxymethyl)ethyl] propionamide); 2,2'-azobis[2-methyl-N(2-hydroxyethyl) propionamide]; 2,2'-azobis(isobutyramide) dihydrate, and the like. These types of initiators, redox, peroxy, and thermal, can be used singly or in a suitable mixture.

The weight average molecular weight ($M_w$) of a water-dispersible acrylic resin is not particularly limited, but generally is at least about 1,500, and preferably at least about 3,000. The $M_w$ of the acrylic resin typically is about 5,000 to about 50,000.

The water-dispersible acrylic resin has pendant carboxylic acid groups, such that after neutralization with a fugitive base, the resin acts as an emulsifier for other waterborne coating composition ingredients, like the epoxy resins, and helps provide a stable waterborne composition by maintaining phase stability of the waterborne coating composition. A water-dispersible acrylic resin also provides crosslinking sites for a waterborne coating composition during cure.

(c) Optional Solid Filler

A waterborne coating composition of the present invention also can contain an optional solid filler. The optional solid filler is present in an amount of 0% to about 30%, and preferably about 5% to about 25%, by weight of nonvolatile material. To achieve the full advantage of the present invention, the solid filler is present in an amount of about 10% to about 25%, by weight of nonvolatile material. The optional solid filler is incorporated into the coating compositions of the present invention in the form of powders, generally ranging from about 1μ (micron) to about 200μ in diameter, and in particular ranging from about 5μ to about 125μ in diameter.

The optional solid filler can be essentially any water-insoluble organic or inorganic compound that does not adversely affect the coating composition or a cured coating composition resulting therefrom, and that does not adversely affect a product stored in a metal container coated with a cured coating composition. Typically, the solid filler is present to act as a pigment, to modify composition viscosity, and/or to improve the barrier properties of a cured coating composition. The optional solid filler conventionally is white in color such that the resulting coating composition is opaque or white in color. However, a colored solid filler can be used to make a colored coating composition when such color is desired.

One example of a useful class of water-insoluble, inorganic compounds is the metal oxides. The metal oxides used in accordance with the present invention are essentially insoluble in water. However, after sufficient stirring or agitation, the metal oxide remains homogeneously dispersed throughout the waterborne coating composition.

Nonlimiting examples of metal oxides, both white and colored, hydrated or anhydrous, include titanium dioxide, magnesium oxide, zinc oxide, barium oxide, zirconium oxide, calcium oxide, silicon dioxide, aluminum oxide, tin oxide, bismuth oxychloride, antimony trioxide, antimony pentoxide, cerium oxide, iron oxide, bismuth oxide, vanadium oxide, cobalt oxide, or mixtures thereof. It is also envisioned that multiple metal oxides, such as magnesium aluminum oxide, zinc aluminum oxide, magnesium titanium oxide, iron titanium oxide, calcium titanium oxide, or mixtures thereof, can be used in the waterborne coating composition of the present invention. The metal oxides and multiple metal oxides can be used in combination.

In addition to the metal oxides, other water insoluble, inorganic compounds, like barium sulfate or calcium sulfate, can be used as the optional solid filler. Additional inorganic compounds that can be used as the optional solid filler include, but are not limited to, aluminum hydrate, aluminum silicate, zinc sulfate, zinc phosphate, calcium silicate, magnesium silicate, magnesium sulfate, magnesium phosphate, and mixtures thereof.

Other useful optional solid fillers include: (a) metallic pigments, such as, for example, aluminum, nickel, zinc, tin, and mixtures thereof; (b) water-insoluble organic pigments, such as, for example, phthalocyanine blue, phthalocyanine green, azin pigments, and indothern blue; (c) polymeric micro voids. The various classes of optional solid fillers can be used alone or in combination.

(d) Fugitive Base

The waterborne coating compositions contain a water-dispersible acrylic resin having a sufficient amount of monomers capable of rendering the resin dispersible in water. The monomers typically are α,β-unsaturated carboxylic acids and these monomers render the resin water dispersible by neutralizing the carboxylic acid moieties with a fugitive base. A waterborne coating composition of the present invention, therefore, also includes a fugitive base. A fugitive base is added to neutralize the carboxylic acid groups of the acrylic resin, and thereby provide an emulsifier for a waterborne coating composition. A minor portion of the fugitive base may interact with epoxy functionalities present in a waterborne coating composition to provide β-hydroxy quaternary ammonium functionalities, which also assist in emulsification of composition ingredients.

A fugitive base is included in a sufficient amount such that about 20% to about 200%, and preferably about 50% to about 175%, of the carboxylic acid groups present in the water-dispersible acrylic resin are neutralized. An excess amount of fugitive base does not adversely affect a waterborne coating composition, and tends to improve the storage stability of the waterborne coating composition. A fugitive base most preferably is present in an amount sufficient to neutralize about 75% to about 150% of the carboxylic acid groups present in a waterborne coating composition. The precise amount of fugitive base added to the composition is determined from the acid number of the polymer system and from the basicity of fugitive base.

A fugitive base is a relatively volatile compound that is expelled from a waterborne coating composition during cure. Accordingly, a waterborne coating composition, during cure, reverts to a more water insoluble form and, therefore, provides a cured coating composition that exhibits excellent chemical resistance and excellent blush resistance.

A fugitive base usually is a primary, secondary or tertiary amine, either aromatic or aliphatic, or a primary, secondary or tertiary alkanolamine, or an ammonium, alkylammonium hydroxide, or arylammonium hydroxide, or mixtures thereof. Nonlimiting examples of a fugitive base include ammonium hydroxide, a tetraalkylammonium hydroxide, wherein an alkyl group has one to about 4 carbon atoms (e.g., tetramethylammonium hydroxide), monoethanolamine, dimethylamine, methyldiethanolamine, benzylamine, diisopropylamine, butylamine, piperazine, dimethylethanolamine, diethylethanolamine, diethanolamine, morpholine, N-methylmorpholine, N-ethylmorpholine, triethylamine, 2-dimethylamine-2-methyl-1-propanol, 2-amino-2-methyl-1-propanol, piperidine, pyridine, dimethylaniline, and similar amines and alkanolamines, and mixtures thereof.

(e) Other Optional Ingredients

A waterborne coating composition of the present invention also can include other optional ingredients that do not adversely affect the waterborne coating composition or a cured coating composition resulting therefrom. Such optional ingredients are known in the art, and are included in a waterborne coating composition to enhance composition esthetics; to facilitate manufacturing, processing, handling and application of the composition; and to further improve a particular functional property of a waterborne coating composition or a cured coating composition resulting therefrom.

Such optional ingredients include, for example, dyes, additional anticorrosion agents, flow control agents, thixotropic agents, dispersing agents, antioxidants, adhesion promoters, light stabilizers, and mixtures thereof. Conventionally, a nonionic or an anionic surfactant is included in a waterborne coating composition to improve flow properties. A wax emulsion and/or dispersion of a synthetic lubricant is included to improve the slip properties of a cured coating composition. Each optional ingredient is included in a sufficient amount to serve its intended purpose, but not in such an amount to adversely affect a waterborne coating composition or a cured coating composition resulting therefrom.

(f) Carrier

A present waterborne coating composition is an aqueous composition, but also contains 450 g or less VOC/kg NVM, and typically about 420 to about 450 g VOC/kg NVM. Preferred compositions have about 400 to 450 g VOC/kg NVM. To achieve the full advantage of the present invention, the composition contains about 350 to 450 g VOC/kg NVM. In general, the volatile organic compounds included in a waterborne coating composition have sufficient volatility to evaporate essentially entirely from the waterborne coating composition during the curing process, such as during heating at about 350° F. (176° C.) to about 500° F. (260° C.) for about 6 seconds to about 15 minutes.

The volatile organic compounds are included as a portion of the carrier to help dissolve, disperse and emulsify composition ingredients, and thereby provide a more stable composition. The volatile organic compounds also are included to improve the physical properties of the composition, like surface tension, flow out during the bake, and viscosity, and thereby provide a composition that is easier to apply and that provides a more uniform cured coating. The volatile organic compounds improve the flow properties of a waterborne coating composition and facilitate spraying of a waterborne coating composition.

Present-day commercial waterborne coating compositions have a high VOC, i.e., greater than 450 g VOC/kg NVM. Such high VOC compositions pose toxicological problems to coatings manufacturers and to coatings applicators, and pose environmental problems in general. In accordance with an important feature of the present invention, a present waterborne composition includes 450 g or less VOC/kg NVM, thereby substantially alleviating the toxicological and environmental problems posed by prior waterborne coating compositions. Surprisingly, a waterborne coating composition of the present invention, having such a low VOC, is phase stable and provides uniform cured coatings.

Numerous volatile organic compounds can be included in a present waterborne coating composition in an aggregate amount of 450 g or less VOC/kg NVM. Suitable volatile organic compounds have a sufficiently low vapor pressure to resist evaporation during storage and a sufficiently high vapor pressure to be evaporated from the waterborne coating composition during cure. Exemplary, nonlimiting volatile organic compounds include, but are not limited to, the methyl, ethyl, propyl, butyl, hexyl or phenyl ether of ethylene glycol, diethylene glycol, triethylene glycol, propylene glycol or dipropylene glycol; ethylene glycol methyl ether acetate; ethylene glycol ethyl ether acetate; ethylene glycol butyl ether acetate; diethylene glycol ethyl ether acetate; diethylene glycol butyl ether acetate; propylene glycol methyl ether acetate; dipropylene glycol methyl ether acetate; n-butanol; hexyl alcohol; hexyl acetate; methyl n-amyl ketone; butylene glycol; propylene glycol; diisobutyl ketone; methyl propyl ketone; methyl ethyl ketone; methyl isobutyl ketone; 2-ethoxyethyl acetate; t-butyl alcohol; amyl alcohol; 2-ethylhexyl alcohol; cyclohexanol; isopropyl alcohol; and similar organic solvents, and mixtures thereof.

A preferred volatile organic compound is n-butanol because an epoxy resin is easily dispersed in n-butanol; a water-dispersible acrylic resin is readily prepared in n-butanol; and n-butanol is easily removed by azeotropic distillation to provide a waterborne coating composition having a low amount of VOC.

A carrier also can include a relatively low amount of a nonpolar organic compound, such as up to about 10% by total weight of the carrier, without adversely affecting a waterborne coating composition, either prior to or after curing. Exemplary nonpolar organic compounds include a chlorinated hydrocarbon, an aliphatic hydrocarbon or an aromatic hydrocarbon, like toluene, benzene, xylene, mineral spirits, kerosene, naphtha, heptane, hexane, and similar hydrocarbons, and combinations thereof.

A carrier is included in the composition in a sufficient amount to provide a waterborne coating composition including about 10% to about 60%, and preferably about 15% to about 50%, by weight of the composition, of nonvolatile material. To achieve the full advantage of the present invention, a waterborne coating composition includes about 20% to about 50% by weight of the composition of nonvolatile material.

The amount of carrier included in a waterborne coating composition is limited only by the desired, or necessary, Theological properties of a waterborne coating composition. Usually, a sufficient amount of carrier is included in a waterborne coating composition to provide a composition that can be processed easily, that can be applied to a metal substrate easily and uniformly, and that is sufficiently evaporated from a waterborne coating composition during cure within the desired cure time.

Therefore, essentially any carrier comprising a major portion of water and a minor portion of volatile organic compounds is useful in the present waterborne coating composition as long as the carrier adequately disperses, emulsifies and/or solubilizes the composition components; is inert with respect to interacting with composition components and thereby adversely affecting the stability of the coating composition or the ability of the coating composition to effectively cure; and evaporates quickly, essentially entirely and relatively rapidly to provide a cured coating composition that inhibits the corrosion of a metal substrate, that does not adversely affect a food or beverage that contacts the cured coating composition, and that demonstrates sufficient physical properties, like adhesion and flexibility, for use as a coating on the interior or exterior of a container.

A waterborne coating composition of the present invention is prepared by dispersing an epoxy resin in the carrier or a portion thereof, then either preparing a water-dispersible acrylic resin in situ, in the presence of the epoxy resin, or adding a preformed water-dispersible acrylic resin having pendant carboxylic acid groups to the epoxy resin. A fugitive base then is added to the resulting mixture, and finally water and organic solvents are added to adjust the amount of nonvolatile material in the waterborne coating composition to a predetermined level. The optional solid filler, and other optional ingredients, can be added to the waterborne coating composition either prior to or after the addition of water or organic solvents.

To demonstrate the usefulness of a waterborne coating composition of the present invention, the following Examples were prepared, then applied to a metal substrate, and finally cured to provide a coated metal substrate. The coated metal substrates then were tested for use as a food or beverage container. The cured coatings were tested for an ability to inhibit corrosion of a metal substrate; for adhesion to the metal substrate; for chemical resistance; for flexibility; and for scratch and mar resistance.

General Method of Preparing a Waterborne Coating Composition

An epoxy resin having an EEW of about 5,000 to about 12,000 and n-butanol are charged into a three-necked vessel equipped with a stirrer. The mixture is heated to about 120° C. under a nitrogen blanket, then a blend of an $\alpha,\beta$-unsaturated carboxylic acid, an $\alpha,\beta$-unsaturated ester, additional vinyl or acrylic monomers, and benzoyl peroxide initiator, is added dropwise to the heated mixture over a period of about one hour. After the addition, the resulting mixture is held at about 125° C. for about two hours. After cooling the mixture to about 95° C., a blend of dimethylaminoethanol and deionized water is added to the mixture over a period of about 10 minutes, followed by the dropwise addition of deionized water over about a one-hour period. A stable waterborne dispersion results. The waterborne dispersion then is heated to remove n-butanol by azeotropic distillation. A solid filler then can be added to the composition with sufficient stirring to homogeneously disperse the solid filler throughout the waterborne coating composition. The resulting waterborne coating composition is a white, stable, aqueous dispersion having a VOC of 450 g or less VOC/kg NVM.

The following Examples 1–30 were prepared by the same general method set forth above. The compositions of Examples 1–30 each contain a epoxy resin having an EEW of about 5,000 to about 12,000; a water-dispersible acrylic resin having pendant carboxylic acid groups; and a fugitive base. Furthermore, each of the waterborne coating compositions of Examples 1–30 has a sufficiently low surface tension to effectively wet a aluminum substrate.

The surface tension of a waterborne coating composition can be reduced by the addition of an anionic or nonionic surfactant. The waterborne coating composition then can effectively wet other metal substrates, like tin-plated steel, that have a surface tension of about 30 to 35 dynes/cm and are more difficult to wet than aluminum. The addition of a surfactant to reduce the surface tension also permits an easier application of the waterborne coating composition to aluminum substrates. A waterborne coating composition of the present invention, therefore, demonstrates the advantage of effectively wetting a metal substrate to provide a smooth, uniform film.

|  | Example 1 | Example 2 | Example 3 | Example 4 | Example 5 |
| --- | --- | --- | --- | --- | --- |
| Weight Ratio of Epoxy Resin to Acrylic Resin | 81/19 | 77/23 | 77/23 | 77/23 | 81/19 |
| Monomers of the Acrylic Resin (% by weight)[1] | Styrene (30) MAA[2] (35) BA[4] (35) | Styrene (30) MAA (35) BA (35) | Styrene (30) MAA (17.5) AA[6] (17.5) BA (35) | Styrene (30) MAA (25) AA (25) BA (20) | Styrene (25) MAA (45) BA (25) HEMA[8] (5) |
| EEW of the Epoxy Resin | 7,100 | 7,030 | 6,650 | 6.650 | 6.780 |
| NVM | 35.0[7] | 35.0 | 33.0 | 33.0 | 35.0 |
| VOC[3] | 647[5] | 490 | 647 | 688 | 647 |
| Viscosity[10] | 10,400 | — | 20,000 | — | 8,320 |
| pH | 9.31 | 8.56 | 8.69 | 8.70 | 9.13 |

|  | Example 6[9] | Example 7 | Example 8 | Example 9 | Example 10 |
| --- | --- | --- | --- | --- | --- |
| Weight Ratio of Epoxy Resin to Acrylic Resin | 81/19 | 81/19 | 77/23 | 81/19 | 81/19 |
| Monomers of the Acrylic Resin (% by weight) | Styrene (30) MAA (35) BA (35) | Styrene (10) MAA (45) BA (45) | Styrene (10) MAA (35) BA (55) | Styrene (27.5) MAA (45) BA (27.5) | Styrene (17.5) MAA (65) BA (17.5) |
| EEW of the Epoxy Resin | 6,840 | 6,840 | 7,040 | 6,780 | 7,220 |
| NVM | 28.0 | 36.0 | 33.0 | 35.0 | 32.0 |
| VOC[3] | 692 | 716 | 600 | 647 | 647 |
| Viscosity[10] | 1,440 | 12,600 | 6,920 | 7,240 | 3,240 |
| pH | 9.15 | 9.18 | 8.95 | 9.17 | 8.17 |

|  | Example 11[11] | Example 12 | Example 13[12] | Example 14 | Example 15 |
| --- | --- | --- | --- | --- | --- |
| Weight Ratio of Epoxy Resin to Acrylic Resin | 81/19 | 81/19 | 81/19 | 81/19 | 81/19 |
| Monomers of the Acrylic Resin (% by weight) | Styrene (27.5) MAA (45) BA (27.5) | Styrene (27.5) MAA (45) BA (27.5) | Styrene (27.5) MAA (45) BA (27.5) | Styrene (27.5) MAA (45) BA (27.5) | MAA (45) BA (55) |
| EEW of the Epoxy Resin | 6,780 | 5,050 | 1,020 | 2.950 | 8,210 |
| NVM | 32.9 | 26.0 | — | — | — |
| VOC[3] | 556 | 647 | — | — | — |
| Viscosity[10] | 17,840 | 19,440 | — | — | — |
| pH | 8.67 | 9.19 |  |  |  |

|  | Example 16 | Example 17 | Example 18 | Example 19 | Example 20 |
| --- | --- | --- | --- | --- | --- |
| Weight Ratio of Epoxy Resin to Acrylic Resin | 81/19 | 81/19 | 81/19 | 81/19 | 81/19 |
| Monomers of the Acrylic Resin (% by weight) | Styrene (29.3) MAA (37.9) BA (32.5) | Styrene (29.3) MAA (37.9) BA (32.5) | Styrene (27.5) MAA (45) BA (27.5) | Styrene (27.5) MAA (45) BA (27.5) | Styrene (27.5) MAA (45) BA (27.5) |
| EEW of the Epoxy Resin | 8,320 | 9,010 | 4,950 | 9,820 | 11,770 |
| NVM | 35.0 | 35.0 | 35.0 | 33.0 | 33.0 |
| VOC[3] | 626 | 626 | 647 | 647 | 647 |
| Viscosity[10] | 4,280 | 9,320 | 40,000 | 3,880 | 5,120 |
| pH | 9.25 | 9.25 | 9.30 | 9.26 | 9.20 |

|  | Example 21 | Example 22 | Example 23 | Example 24 | Example 25 |
| --- | --- | --- | --- | --- | --- |
| Weight Ratio of Epoxy Resin to Acrylic Resin | 50/50 | 65/35 | 70/30 | 70/30 | 70/30 |
| Monomers of the Acrylic Resin (% by weight) | MAA (14.4) BA (85.6) | Styrene (30) MAA (35) BA (35) | MAA (24) BA (76) | MAA (24) EMA[4] (76) | MAA (24) MMA[4] (76) |
| EEW of the Epoxy Resin | 7,050 | 6,820 | 7,050 | 7,560 | 7,560 |

-continued

|  | | | | | |
|---|---|---|---|---|---|
| NVM | 38.0 | — | 35.0 | 25.0 | 18.0 |
| VOC[3] | 600 | — | 600 | 600 | 600 |
| Viscosity[10] | 1,260 | — | 3,040 | 2,640 | 33,000 |
| pH | 8.76 | — | 9.23 | 9.21 | 9.17 |

|  | Example 26[13] | Example 27 | Example 28[14] | Example 29 | Example 30 |
|---|---|---|---|---|---|
| Weight Ratio of Epoxy Resin to Acrylic Resin | 81/19 | 81/19 | 81/19 | 81/19 | 81/19 |
| Monomers of the Acrylic Resin (% by weight) | Styrene (27.5) MAA (45) BA (27.5) | Styrene (27.5) MAA (45) BA (27.5) | Styrene (27.5) MAA (45) BA (27.5) | Styrene (29.3) MAA (37.9) BA (32.8) | Styrene (25) MAA (45) BA (25) HEMA (5) |
| EEW of the Epoxy Resin | 7,150 | 5,050 | 6,980 | 8,160 | 7,220 |
| NVM | 33.0 | 26.0 | 23.0 | 35.0 | 35.0 |
| VOC[3] | 647[5] | 647 | 647 | 627 | 647 |
| Viscosity[10] | 9,840 | 19,440 | 12,100 | 7,360 | 16,840 |
| pH | 9.31 | 9.19 | 9.38 | 9.20 | 9.28 |

[1]weight percent of each monomer in the monomer blend used to prepare the water-dispersible acrylic resin;
[2]MAA-methacrylic acid;
[3]VOC of the composition prior to addition of titanium dioxide;
[4]BA-butyl acrylate, EMA-ethyl methacrylate, MMA-methyl methacrylate;
[5]g VOC/kg NVM;
[6]AA-acrylic acid;
[7]% by weight nonvolatile material;
[8]HEMA-hydroxyethylmethacrylate;
[9]modified with 2% by weight stearic acid;
[10]Viscosities are reported in centipoise (cps), measured using a Brookfield viscometer at 25° C. with a #3 spindle at 3 rpm;
[11]trimellitic acid modified epoxy resin added during synthesis of the acrylic resin, i.e., URANOX ZW3438EE, a 95% by weight active material available from DSM Resins, Netherlands;
[12]comparative example;
[13]contains 15% by weight modified bisphenol F modified epoxy resin; and
[14]contains 2.47% by weight methyl isobutyl ketone.

The following Table 1 sets forth the individual amounts of ingredients used to prepare duplicate batches of the composition of Example 1 (i.e., Examples 1E and 1G), and to prepare the compositions of Examples 3 and 4.

TABLE 1

| Ingredient[16] | Ex. 1E | Ex. 1G | Ex. 3 | Ex. 4 |
|---|---|---|---|---|
| Epoxy Resin | 27.54 | 28.55 | 25.41 | 26.61 |
| Styrene | 1.94 | 2.01 | 2.28 | 2.38 |
| Methacrylic Acid | 2.26 | 2.34 | 1.33 | 1.98 |
| Acrylic Acid | — | — | 1.33 | 1.98 |
| Butyl Acrylate | 2.26 | 2.34 | 2.65 | 1.59 |
| Xylene | 0.63 | 0.65 | 0.58 | 0.61 |
| Ethyleneglycol | 11.40 | 17.23 | 10.61 | 11.12 |

TABLE 1-continued

| Ingredient[16] | Ex. 1E | Ex. 1G | Ex. 3 | Ex. 4 |
|---|---|---|---|---|
| Monobutyl ether of ethylene glycol | 4.89 | 2.29 | 4.55 | 4.71 |
| Butanol | 2.61 | — | 2.42 | 2.54 |
| Dimethylethanolamine | 2.46 | 2.55 | 3.17 | 4.74 |
| Deionized water | 44.01 | 42.05 | 45.67 | 41.68 |

[16]percent by weight.

Table 2 lists physical constants measured for five replicate compositions of Example 1, i.e., Examples 1A–1E. The physical constants were measured on compositions containing an epoxy resin and an acrylic resin, prior to the addition of an optional solid filler or dilution with water. The VOC of the compositions of Examples 1A through 1E can be adjusted to 450 g or less VOC/kg NVM by azeotropic distillation of organic solvents from the composition and/or by the addition of an optional solid filler.

TABLE 2

|  | Ex. 1A | Ex. 1B | Ex. 1C | Ex. 1D | Ex. 1E |
|---|---|---|---|---|---|
| Weight Ratio of Epoxy Resin to Acrylic Resin | 81/19 | 81/19 | 81/19 | 81/19 | 81/19 |
| Monomers of the Acrylic Resin (By wt. of monomers) | | | | | |
| Styrene | 30 | 30 | 30 | 30 | 30 |
| MAA | 35 | 35 | 35 | 35 | 35 |
| BA | 35 | 35 | 35 | 35 | 35 |
| Carrier and Fugitive | | | | | |

TABLE 2-continued

|  | Ex. 1A | Ex. 1B | Ex. 1C | Ex. 1D | Ex. 1E |
|---|---|---|---|---|---|
| Base (by wt of carrier and base) | | | | | |
| Xylene | 2.7 | 2.7 | 2.7 | 2.7 | 2.9 |
| Diethylene Glycol | 58 | 58 | 58 | 58 | 51.8 |
| Butyl Cellosolve | 14.9 | 14.9 | 14.9 | 14.9 | 22.2 |
| Butanol | 14.1 | 14.1 | 14.1 | 14.1 | 11.9 |
| Dimethylethanolamine | 10.3 | 10.3 | 10.3 | 10.3 | 11.2 |
| NVM[21] (th.)[17] | 33.0% | 33.0% | 33.0% | 33.0% | 34.0% |
| NVM[21] (exp.)[17] | 32.0% | 31.9% | 32.3% | 32.7% | 33.0% |
| VOC[22] (th) | 699 g/kg | 699 g/kg | 699 g/kg | 699 g/kg | 647 g/kg |
| VOC[22] (exp.) | 721 g/kg | 724 g/kg | 714 g/kg | 706 g/kg | 667 g/kg |
| Visc.[18] | 135,000 | 164,000 (59,200)[19] | 150,0000 | outside measuring range | 88,400 (49,600)[19],[20] |
| pH | 8.45 | 8.53 | 8.45 | 8.55 | 8.45 |

[17]th.-theoretical; exp.-experimental;
[18]in cps measured at 0.6 rpm using a #3 spindle;
[19]in cps measured at 3.0 rpm using a #3 spindle;
[20]after holding at a temperature of about 50° C. for about 2 hours;
[21]by weight of the composition; and
[22]by g VOC/kg NVM.

Various epoxy-acrylate resins of Examples 1–30 were incorporated into coating compositions, and the coating compositions individually were applied to a metal substrate, and then cured to provide a coated metal substrate. The coated metal substrates then were tested for use as the interior surface of a food or beverage container. As will be demonstrated more fully hereafter, a cured coating composition resulting from curing a waterborne coating composition of the present invention is suitable as the interior coating of a metal container for food or beverages. Surprisingly, a present waterborne coating composition provided excellent cured coating compositions in the absence of a phenolic resin or aminoplast crosslinking agent.

In particular, the following are exemplary waterborne coating compositions incorporating an epoxy-acrylate resin of Examples 1–30, and applied to a metal substrate.

| Ingredient[16] | |
|---|---|
| Epoxy-Acrylic Resin | 68.1 |
| Titanium Dioxide | 21.3 |
| Solvent[23] | 3.9 |
| Deionized Water | 4.9 |
| Pigment Paste[24] | 0.06 |
| Wax | 1.5 |
| Slip Aid[25] | 0.24 |
| Epoxy-Acrylic Resin | 68.26 |
| Titanium Dioxide | 19.45 |
| Solvent[23] | 1.52 |
| Deionized Water | 0.76 |
| Pigment Paste[24] | 0.06 |

| Ingredient[16] -continued | |
|---|---|
| Wax | 1.50 |
| Slip Aid[25] | 0.27 |

[23]a blend of tripropylene glycol and the monobutyl ether of ethylene glycol;
[24]Pintasol Violett, available from Sandoz, Huningue, France; and
[25]LOXIOL G16, available from Henkel.

A waterborne coating composition of the present invention is applied to a metal substrate as a film, then cured for a sufficient time at a sufficient temperature, such as for about 6 seconds to about 15 minutes at about 350° F. (176° C.) to about 500° F. (260° C.), to provide an adherent cured coating composition on the metal substrate. The coated metal substrate then is shaped into a container or other metal article.

Therefore, various epoxy-acrylate resins of Examples 1–30 were formulated into coating compositions, and each coating composition was individually applied to a clean, untreated metal substrate in a sufficient amount to provide a cured film thickness of about 5 to about 7.5μ (microns). Each composition contained titanium dioxide (about 21% by weight) and a solids content (NVM) of about 40% to about 50% by weight, and was applied to the aluminum substrate as a thin film. After applying a composition to a tinplate substrate, the composition was cured at 375° F. (190° C.) for about 10 minutes. Each of the cured coating compositions had a smooth, white appearance, and was defect free. The results of other comparative tests performed on the cured coatings are summarized below.

| Test Number | 1[26),27)] | 2[26),27)] | 3[26),27),28)] | 4 | 5 | 6 |
|---|---|---|---|---|---|---|
| Composition: | Ex. 9 | Ex. 9 | Ex. 9 | Ex. 2 | Ex. 1E | Ex. 1A |
| Epoxy/Acrylic Ratio: | 81/19 | 81/19 | 81/19 | 77/23 | 81/19 | 81/19 |
| Other Ingredients: | TiO$_2$, water, DMEA[29] | TiO$_2$, water, DMEA | TiO$_2$, water, DMEA | TiO$_2$, water, DMEA | TiO$_2$, water, DMEA | TiO$_2$, water, DMEA |
| Test: | | | | | | |
| Viscosity (DIN 4") | 81" | 92" | 78" | 110" | — | — |
| Density (g/cm$^3$) | — | — | — | — | — | — |
| Substrate | Tin Plate | Tin Plate | Tin Plate | Tin plate | Tin plate | Tin plate |

-continued

| | | | | | | |
|---|---|---|---|---|---|---|
| Curing Conditions | 10 min/190° C. | 10 min/190° C. | 10 min/190° C. | 10 min/190° C. | 10 min/190° C. | 10 min/195° C. |
| Curing Residue | 41.5% | 39.5% | 41.5% | — | — | — |
| Appearance | good | Slightly matted | good | good | good | good |
| Film Thickness | 6μ | 6μ | 6.5μ | 6.5μ | 6μ | about 12 g/m² |
| Altek Value | 0.04 | 0.06–0.07 | 0.03 | — | 0.06–0.07 | 0.06–0.09 |
| Acetone Test | >100 | >100 | >100 | >100 | >100 | >100 |
| Dur-O-Test | 800 g | 500 g | >1000 g | 900 g | 700 g | 650 g |
| Crosshatch | 0 | 0 | 0 | 0 | 0 | 0 |
| Erichson Cup/Cup Sterilization | 0/0– | 0/0– | 0/0– | 0–/0–1 | 0–/0–1 | 0/0 |
| Wedge Bend Test | 76% | 75% | 75% | 83% | 61–67% | 80% |
| Beading Sterilization (1 hr/121° C.) | 0.5 mm | 0.5 mm | 0.5 mm | — | 0.8 mm | 1.0 mm |
| D (GT/DT) | 0–/550 g | 0–1/450 g | 0/950 g | 0/700 g | 0/1000 g | 0/>1000 g |
| S (GT/DT) | 1/650 g | 2–3/450 g | –1/700 g | 0/700 g | 1/1000 g | 0–1/1000 g |
| R (GT/DT) | 1–2/450 g | 1–2/450 g | 0–/300 g | 0–/700 g | 2–3/850 g | 1/1000 g |
| O (GT/DT) | 0/300 g | 0/450 g | 0/800 g | 0/700 g | 2–3/1000 g | 1/1000 g |
| Sterilization (1hr/128° C.) | | | | | | |
| Me (GT/DT) | 4–5/250 g | –1/400 g | 0–1/200 g | 3/300 g | 3–4/500 g | — |
| Cy (GT/DT) | 3–4/300 g | 2/250 g | 1–2/250 g | 4/450 g | –5/550 g | — |
| NaCl/HAc (GT/DT)[30] | 0/600 g | 0/300 g | 0/700 g | 0–1/300 g | 4–5/700 g | — |
| Tap Water (GT/DT) | 0–/450 g | 0/400 g | 0/650 g | — | — | — |
| Bouillon Plasmal (GT) | 3 | 0 | 0 | — | — | — |

| Test Number | 7 | 8 | 9[27] | 10[26),27)] | 11[26),27)] | 12[26)] |
|---|---|---|---|---|---|---|
| Composition: | Ex. 1 | Ex. 1 | Ex. 1 | Ex. 1 | Ex. 5 | Ex. 5 |
| Epoxy/Acrylic Ratio: | 81/19 | 81/19 | 81/19 | 81/19 | 81/19 | 81/19 |
| Other Ingredients: | TiO₂, water, DMEA | TiO₂, water, DMEA | TiO₂, water, DMEA | TiO₂, water, DMEA | TiO₂, water, DMEA | TiO₂, water, DMEA |
| Test: | | | | | | |
| Viscosity (DIN 4") | 66" | 90" | 100" | 140" | 85" | 65" |
| Density (g/cm³) | — | 1.25 | 1.22 | 1.24 | 1.20 | 1.20 |
| Substrate | Tin plate | Tin plate | Tin plate | Tin plate | Tin plate | Tin plate |
| Curing Conditions | 10 min/190° C. | 10 min/190° C. | 10 min/190° C. | 10 min/180° C. | 10 min/190° C. | 10 min/190° C. |
| Curing Residue | 45.54% | — | 45% | 44.5% | 42.5% | 42% |
| Appearance | good | good | good | good | good | good |
| Film Thickness | 7μ | 6μ | 7.5μ | 7μ | 7μ | 5μ |
| Altek Value | 0.09–0.11 | 0.05 | 0.03 | 0.03 | 0.03 | 0.025 |
| Acetone Test | >100x | >100x | >100x | >100x | >100x | >100x |
| Dur-O-Test | 750 g | 800 g | 1000 g | 1000 g | 1000 g | 1000 g |
| Crosshatch | 0 | 0 | 0 | 0 | 0 | 0 |
| Erichson Cup/Cup Sterilization | 0/0–1 | 0/0–1 | 0/0– | 0/0– | 0/0– | 0/0– |
| Wedge Bend Test | 75% | 81% | 77.80% | 75% | 75% | 80% |
| Beading Sterilization (1 hr/121° C.) | 0.9 mm | — | 0.7 mm | 0.8 mm | 0.5 mm | 0.6 mm |
| D (GT/DT) | 0/1000 g | 1/1000 g | 0/1000 g | 0/750 g | 0/1000 g | 0/1000 g |
| S (GT/DT) | 0–/950 g | 0/1000 g | 0/1000 g | 0–/1000 g | 1/1000 g | 1/750 g |
| R (GT/DT) | 0–1/950 g | 0–1/1000 g | 0/1000 g | 0–/500 g | 0/400 g | 0/450 g |
| O (GT/DT) | 0–1/650 g | 0/1000 g | 0/950 g | 0/700 g | 0/800 g | 0/700 g |
| Sterilization (1 hr/128° C.) | | | | | | |
| Me (GT/DT) | — | 5/400 g | 3/400 g | 0–/400 g | 0/450 g | 1–/400 g |
| Cy (GT/DT) | — | 2/1000 g | 3/500 g | 0–/400 g | 0–/400 g | 1/300 g |
| NaCl/HAc (GT/DT)[30] | — | 1–2/1000 g | 2–3/500 g | 2–3/600 g | 0/500 g | 0/400 g |
| Tap Water (GT/ST) | — | — | — | 0 | 0 | 0/850 g |
| Bouillon Plasmal (GT) | — | 0 | 0 | 0 | 0 | 0 |

| Test Number | 13 | 14 | 15 | 16 |
|---|---|---|---|---|
| Composition: | Ex. 5 | Ex. 1 | Comparative Epoxy | Comparative Epoxy |
| Epoxy/Acrylic Ratio: | 81/19 | 81/19 | — | — |
| Other Ingredients: | TiO₂, DMEA, water | TiO₂, DMEA, water | | |
| Tests: | | | | |
| Viscosity (DIN 4") | 85" | 51" | 100" | 110" |
| Density (g/cm³) | 1.20 | 1.27 | 1.23 | 1.22 |
| Substrate | Tin plate | Tin plate | Tin plate | Tin plate |
| Curing Conditions | 10 min/190° C. | 10 min/190° C. | 10 min/190° C. | 10 min/190° C. |
| Curing Residue | 45% | 48% | 51% | 51% |
| Appearance | good | good | good | good |
| Film Thickness | 5μ | 7.5μ | 7μ | 6.5μ |
| Altek Value | 0.025 | 0.05 | 0.03 | 0.04–0.05 |

-continued

| | | | | |
|---|---|---|---|---|
| Acetone Test | >100x | >100x | >100x | >100x |
| Dur-O-Test | 1000 g | 1000 g | 800 g | 900 g |
| Crosshatch | 0 | 0 | 0 | 0 |
| Erichson Cup/Cup Sterilization | 0/0– | 0–/0–1 | 0–/0–1 | 0/0– |
| Wedge Bend Test | 75% | 61–75% | 77% | 77% |
| Beading | 0.5 mm | — | — | — |
| Sterilization (1 hr/121° C.) | | | | |
| D (GT/DT) | 0–/1000 g | 0/1000 g | 0/800 g | 0/800 g |
| S (GT/DT) | 0–/800 g | 2/850 g | 0–1/700 g | 0–1/600 g |
| R (GT/DT) | 0–/800 g | 0–/800 g | 0/900 g | 0/800 g |
| O (GT/DT) | 0–1/800 g | 0/550 g | 0/650 g | 0/700 g |
| Sterilization (1 hr/128° C.) | | | | |
| Mi (GT/DT) | 5/100 g | 4/450 g | 2/400 g | 1–2/400 g |
| Cy (GT/DT) | 3–4/600 g | 2/450 g | 2–3/100 g | 4–5/450 g |
| NaCl/HAc (GT/DT)[30] | 1–2/200 g | 2/900 g | 0/1000 g | 0–1/300 g |
| Tap Water (GT/DT) | 0/1000 g | — | — | — |
| Bouillon Plasmal (GT) | 0 | 0 | 0 | 0 |

| Test Number | 17 | 18 | 19 | 20 | 21 |
|---|---|---|---|---|---|
| Composition: | Ex. 18 | Ex. 1 | Ex. 19 | Ex. 26 | 71% Ex. 1<br>29% Ex. 20 |
| Epoxy/Acrylic Ratio: | 81/19 | 81/19 | 81/19 | 81/19 | 81/19 |
| Other Ingredients: | TiO$_2$, water, DMEA[23] | TiO$_2$, water, DMEA | TiO$_2$, water, DMEA | TiO$_2$, water, DMEA | TiO$_2$, water, DMEA |
| Tests: | | | | | |
| Viscosity (DIN 4") | — | 55" | — | — | — |
| Density (g/cm$^3$) | — | — | — | — | — |
| Substrate | Tin plate | Tin plate | Tin plate | Tin plate | Tin plate |
| Curing Conditions | 10 min/190° C. | 10 min/190° C. | 10 min/190° C. | 10 min/190° C. | 10 min/196° C. |
| Curing Residue | — | 45.1% | — | — | — |
| Appearance | good | good | opaque | pearlescent | slight blush |
| Film Thickness | 6μ | 6μ | 8.5μ | 7.5μ | 8μ |
| Altek Value | 0.03 | 0.04 | 0.08 | 0.06 | 0.04 |
| Acetone Test | >100 | >100 | >100 | >100 | >100 |
| Dur-O-Test | >1000 g | >1000 g | >1000 g | >1000 g | >1000 g |
| Crosshatch | 0 | 0 | 0 | 0 | 0 |
| Erichson Cup/Cup Sterilization | 0/0–1 | 0/ | 0 | 0 | 0 |
| Wedge Bend Test | 68% | 72% | 55.63% | 69% | 68–71% |
| Beading | 0.6 mm | 0.6 mm | 0.3 mm | 0.6 mm | 0.4 mm |
| Sterilization (1 hr/121° C.) | | | | | |
| D (GT/DT) | 0–/>1000 g | 0/>1000 g | — | 0–1/>1000 g[32] | 0/>1000 g |
| S (GT/DT) | 0–1/850 g | 3–4/>1000 g | — | 1–2/>1000 g[32] | 0–1/>1000 g |
| R (GT/DT) | 0–1/950 g | 0/>1000 g | — | 1/>1000 g[32] | 0–1/>1000 g |
| O (GT/DT) | 1/850 g | 0/>1000 g | — | 0–1/950 g[32] | 0>1000 g |
| Sterilization (l hr/128° C.; | | | | | |
| Mi (GT/DT) | 5/300 g | 0–1/600 g | — | –5/300 g | –1/900 g |
| Cy (GT/DT) | 5/400 g | 2–3/850 g | — | 3/400 g | 3/600 g |
| NaCl/HAc (GT/DT)[30] | 5/300 g | –2/750 g | — | 1–/1000 g | 0–1/>100 g |
| Tap Water (GT/DT) | 2–3 | — | — | — | — |

| Test Number: | 22 | 23 |
|---|---|---|
| Composition: | Ex. 17 | Ex. 5 |
| Epoxy/Acrylic Ratio: | 81/19 | 81/19 |
| Other Ingredients: | TiO$_2$, water, DMEA[29] | TiO$_2$, water, DMEA |
| Tests: | | |
| Viscosity (DIN 4") | 87" | 85" |
| Density (g/cm$^3$) | 1.25 | 1.21 |
| Substrate | Tin plate | Tin plate |
| Curing Conditions | 10 min/190° C. | 10 min/190° C. |
| Curing Residue | 42.6% | 40.0% |
| Appearance | good | good |
| Film Thickness | 7μ | 7μ |
| Altek Value | 0.045 | 0.030 |
| Acetone Test | >100 | >100 |
| Dur-O-Test | >1000 g | >1000 g |
| Crosshatch | 0 | 0 |
| Erichson Cup/Cup Sterilization | 0/0– | 0/0– |
| Wedge Bend Test | 78–80% | 80% |
| Beading | 0.5 mm | 0.6 mm |
| D(GT/DT) | 0/1000 g | 2–3/>1000 g |

-continued

| | | |
|---|---|---|
| S(GT/DT) | 0–/1000 g | 0–1/750 g |
| R(GT/DT) | 0/1000 g | 1/>1000 g |
| O(GT/DT) | 0/1000 g | 1/>1000 g |
| Sterilization (1 hr/128° C.) | | |
| Mi (GT/DT) | 4/500 g | 5/<100 g |
| Cy (GT/DT) | 3/500 g | 4/300 g |
| NaCl/HAc (GT/DT)30) | 1–2/1000 g | 4/750 g |

[26]contained 7% by weight URANOX XP8EE;
[27]contained 5% by weight CARBOSET GA 1594 (40% solids), available from BR Goodrich, Akron, O.;
[28]GT-Crosshatch, DT-Dur-O-Test; 0-very good, 5-very poor;
[29]$TiO_2$-titanium dioxide, DMEA-dimethylaminoethanol; and
[30]NaCl-sodium chloride, HAc-acetic acid.

In addition, comparative tests were performed between a composition of the present invention (Example 16) and a commercial waterborne composition containing an epoxy resin and an acrylic resin. A portion of the composition of Example 16 was pigmented by adding 21% by weight titanium dioxide to the composition. The pigmented portion of the composition of Example 16 had a VOC of 450 g VOC/kg NVM, whereas the unpigmented portion had a VOC of 626 g VOC/kg NVM.

The commercial composition contained an epoxy resin having an EEW of about 3,000, and the acrylic resin did not contain an α,β-unsaturated ester. A pigmented version of the commercial composition had a VOC of 510 g VOC/kg NVM, and an unpigmented version had a VOC of 750 g VOC/kg NVM.

In the following tests, identical amounts of the composition of Example 16 and the commercial product, pigmented and unpigmented, were applied as a film to a tin plate substrate, then cured for about 10 minutes at about 190° C. to provide a cured coating composition about 6 to 7μ in thickness. The cured coating compositions were tested according to standard procedures well known to persons skilled in the art.

With respect to a comparison between the unpigmented version of Example 16 and the unpigmented commercial composition, the mechanical properties of the cured coatings (e.g., elasticity, scratch resistance, and adhesion) were essentially identical. However, the composition of Example 16 outperformed the commercial composition in sterilization resistance. The sterilization resistance tests are described in detail hereafter. The commercial composition performed well in D-type sterilizations, but failed other sterilization resistance tests. The composition of Example 16 performed well in D, S, and O-type sterilization tests and outperformed the commercial composition in the Mi, Cy, and NaCl/HAc-sterilization tests.

The test results for crosshatch adhesion tests performed on the cured coatings are summarized in Table 3. The crosshatch adhesion test rates the cured coatings from 0 (best, no adhesion loss) to 5 (worst, total adhesion loss). The crosshatch adhesion tests were performed after the cured coatings were subjected to a sterilization resistance test.

TABLE 3

| Sterilization Test | D | S | R | O | Mi | Cy | NaCl/HAc |
|---|---|---|---|---|---|---|---|
| Example 16 | 0 | 0– | 4–5 | 0– | 4 | 3 | 3 |
| Composition | 0 | 5 | 3–4 | 3–4 | 5 | 4 | 5 |

With respect to a comparison between pigmented versions of the composition of Example 16 and the commercial composition, the mechanical properties were essentially identical, except for elasticity. The pigmented composition of Example 16 outperformed the pigmented commercial composition with respect to elasticity.

The composition of Example 16 also exhibited better adhesion to the metal substrate, as illustrated in Table 4, wherein three separate samples of the pigmented commercial product were compared to pigmented Example 16.

TABLE 4

| | Commercial Composition (#1) | Commercial Composition (#2) | Commercial Composition (#3) | Example 16 |
|---|---|---|---|---|
| Wedge-bend | 50–54% | 52–53% | 48–52% | 75% |
| Beading | 0.3 mm | 0.4 mm | 0.3 mm | 0.5 mm |
| Erichson Cup Adhesion (before process test) | 2 | 1 | 0– | 0 |
| Erichson Cup Adhesion (after D-type process test) | 4 | 2 | 1 | 0– |

0 = best, 5 = worst.

Finally, the pigmented version of Example 16 outperformed the pigmented commercial composition with respect to chemical resistance. The pigmented commercial composition had poor adhesion after each type of adhesion test, especially after an S-type sterilization test.

| Sterilization Test | D | S | R | O | Mi | Cy | NaCl/HAc |
|---|---|---|---|---|---|---|---|
| Commercial Composition (#1) | 0 | 4 | 0 | 0 | — | — | — |
| Commercial Composition (#2) | 0 | 3– | 1–2 | 2 | — | — | — |
| Commercial Composition (#3) | 0– | 4 | 2– | 2 | 5 | 2– | –3 |
| Example 16 | 0 | 0– | 0 | 0 | 4 | 3 | 1–2 |

The present waterborne coating compositions have consistently exhibited coating properties equal to current commercial compositions for similar end uses. For example, compositions of the present invention, after application to a metal substrate and subsequent curing, performed at least as well as present day epoxy-acrylic compositions having a high VOC.

Such a result is unexpected because a waterborne coating composition of the present invention does not include a phenolic resin crosslinking agent. Furthermore, because no phenolic resin or aminoplast is present, no free formaldehyde is present in the film and no free formaldehyde is emitted as a volatile compound during preparation, application, cure, or product packaging in containers having an interior or exterior surface coated with a composition of the present invention. Accordingly, a waterborne composition of the present invention alleviates the toxicological and environmental concerns associated with high VOC and formaldehyde-containing compositions, alleviates the taste problems associated with compositions incorporating a phenolic resin crosslinking agent, and provides a cured coating composition that exhibits properties at least equal to present day can coating compositions.

The data summarized above illustrate that a waterborne coating composition of the present invention provides a cured coating composition useful as the interior or exterior coating of a metal container for food, beverages, cosmetics, chemicals, paints, and similar products.

In particular, the acetone rub test measures resistance of a cured coating to chemical attack. In the acetone rub test, cheesecloth saturated with acetone is rubbed back and forth against a coated metal panel using hand pressure. A rub back and forth is designated as one "double rub." In this test, the cured coating is rubbed until the acetone dissolves or otherwise disrupts the cured coating. Typically, a cured coating passes the acetone rub test if the coating is unaffected by fifty double rubs with the acetone saturated cloth.

As illustrated in the above table, the cured coating compositions of the present invention were unaffected by an excess of 100 double rubs in the acetone rub test. Accordingly, a cured coating composition of the present invention has excellent resistance to chemical attack and can be used as the coating for the interior surface of a food or beverage container.

The present cured coating compositions also demonstrated an excellent adhesion. Adhesion is tested by the crosshatch adhesion test as described hereafter.

The crosshatch adhesion test results demonstrate that a cured coating composition of the present invention maintains essentially complete adhesion to the metal substrate. A coating composition for a metal container must demonstrate excellent adhesion and flexibility because metal containers typically are manufactured by first coating flat sheets of the metal substrate, then forming the coated sheets into a desired shape. Coatings having poor adhesion properties can separate from the metal substrate during the shaping process. A lack of adhesion, therefore, can adversely affect the ability of the cured coating composition to inhibit corrosion of the metal substrate. A present waterborne coating composition exhibits an excellent adhesion to a metal substrate, and, therefore, coating can be applied to a metal substrate, cured, and the metal substrate subsequently can be deformed without adversely affecting continuity of the coating film.

Tests performed on the coating compositions of the present invention generally showed a good viscosity stability over at least a three-month storage period. However, the present compositions have a slight tendency to increase in viscosity over time. Viscosity stability can be enhanced by optimizing the degree of neutralization with a fugitive base. Furthermore, it was observed that adhesion and chemical resistance of a cured coating composition to a metal substrate improves as the EEW of the epoxy resin is increased. By increasing the amount of carboxylic acid groups and HEMA in the acrylic resin, the adhesion after processing is improved.

The following compositions of Examples 31 and 32 are epoxy resin-acrylic resin solutions made according to the above general method of preparing a waterborne coating composition. After reducing the VOC of these compositions to 450 g or less/kg NVM by azeotropic distillation, or addition of a solid filler, the compositions can be used as waterborne coating compositions of the present invention to coat metal substrates.

| Ingredient[31] | Example 40 | Example 41 |
|---|---|---|
| EPON 828[32] | 179.2 | 179.4 |
| Bisphehol A[33] | 104.2 | 103.4 |
| Catalyst 1201 | 0.3 | 0.3 |
| Xylene | 6.1 | 6.5 |
| Diethylene glycol | 117.4 | 117.2 |
| N-butyl Alcohol | 57.5 | 57.4 |
| Methacrylic acid | 25.2 | 29.9 |
| Butyl Acrylate | 21.8 | 16.6 |
| Hydroxyethyl Methacrylate | — | 3.3 |
| Styrene | 19.5 | 16.6 |
| Benzoyl Peroxide | 2.6 | 2.6 |
| Dimethylethanolamine | 37.8 | 44.8 |
| Deionized water | 430.7 | 422.2 |

[31] in parts by weight;
[32] an epoxy resin having an EEW of about 185, available from Shell Chemical Co., Houston, TX; and
[33] a diphenol to advance the EPON 828 and raise the EEW;

The present coating compositions also provided a cured coating composition having excellent flexibility. Flexibility is an important property of a cured polymeric coating because the metal substrate is coated prior to stamping or otherwise shaping the metal substrate into a desired metal article, such as a metal container. The coated metal substrate undergoes severe deformations during the shaping process, and if a coating lacks sufficient flexibility, the coating can form cracks or fractures. Such cracks result in corrosion of the metal substrate because the aqueous contents of the container have greater access to the metal substrate. Metal substrates coated with a present waterborne coating composition were deformed. No cracks or fractures were observed at deformation bends as required for three-piece cans. In addition, as previously described, a cured coating provided by a waterborne coating composition of the present invention is sufficiently adherent to the metal substrate, and remains sufficiently adherent during processing into a metal article, and, therefore, further enhances corrosion inhibition.

A cured coating composition of the present invention maintains adhesion to the metal substrate; is flexible; is sufficiently hard and, therefore, is scratch and mar resistant, and resists chemical attack. Such a combination of advantages is unexpected for a low VOC, epoxy-based waterborne coating composition absent a phenolic agent or aminoplast crosslinking agent. In addition, a composition of the present invention can be cured over the temperature range of about 350° F. (175° C.) to about 500° F. (260° C.), thereby making a waterborne coating composition of the present invention useful in various coating processes without the need to adjust curing parameters. The above combination of advantages is necessary, or at least desirable, in a coating applied to the interior of food and beverage containers.

The properties demonstrated by a waterborne coating composition of the present invention, and a cured coating composition resulting therefrom, show that, contrary to prior teachings, an anhydride, a phenolic resin, or aminoplast resin is not necessary to provide a cured epoxy-based coating composition useful for the interior or exterior of containers, and especially food and beverage containers. The elimination of the phenolic resin or aminoplast crosslinking agent is important in coatings used to coat the interior of food and beverage cans because free formaldehyde present in the crosslinking agent, either as a residual compound or as a result of curing, can adversely affect the food or beverage packaged in the can, especially sensitive foods or beverages like beer.

The above-described tests performed on metal substrates coated with a cured coating composition of the present invention are well known to persons skilled in the art and are summarized as follows:

Crosshatch Adhesion Test

The adhesion of a cured coating composition to the metal substrate is tested after a particular process test. Adhesion was tested by the crosshatch adhesion test wherein razor blades make perpendicular crosshatch patterns in a cured coating. Adhesive tape is applied to the crosshatch patterns, then the adhesive tape is removed at a 90° angle in a fast movement. The amount of extruded coating remaining as the metal substrate then is determined. The cured coating was rated for adhesion according to the following system:

0—perfect (best)
1—very slight pickoff from edges of squares
2—slight pickoff (1–2%)
3—moderate pickoff (2–50%)
4—severe pickoff (>50%)
5—very severe, crosshatching removes the coating (worst).

| Processing Test Solutions | |
|---|---|
| Solution D | Demineralized water |
| Solution S[34] | 40 g concentrated acetic acid |
| | 24 g gelatin |
| | 24 g sodium chloride |
| | 0.4 g crystalline sodium sulfide |
| | ($Na_2S \cdot 9\ H_2O$) |
| | q.s. water to about 800 ml |
| Solution R[34] | 16 g citric acid crystals |
| | 3.2 g vitamin C (ascorbic acid) |
| | q.s. water to about 800 ml |
| Solution O[34] | 16 g citric acid crystals |
| | 0.2 g $H_2O_2$ hydrogen peroxide |
| | (30% sol.) |
| | 0.8 g $NH_4NO_3$ ammonium nitrate |
| | q.s. water to about 800 ml |

[34]The test solutions D, S, R, O have been chosen for cans containing a wide variety of food fillings. These process tests are conducted for 1 hour at 121° C.

Mi (Lactic Acid), Cy (Cysteine), NaCl/HAc (Sodium Chloride/Acetic Acid) and Bouillon Plasmal Tests A coated substrate is put vertically into a metal can, then a test solution is added to the can and held at 128° C. for one hour. The lactic acid solution is a 1% aqueous lactic acid solution. The cysteine solution contains 0.45 g cysteine and about 10 g of phosphate per liter of aqueous solution. The NaCl/HAc solution contains 2% sodium chloride and 3% acetic acid in water. The Plasmal Bouillon test utilizes 132 g of bouillon concentrate and 22 g of plasmal in 11 liters of water.

Altek Value

The Altek value is a measure of the coefficient of friction of a coated metal substrate. The value is determined using a commercial testing apparatus available from Altek Company, Torrington, Conn.

Dur-O-Test

This test measures hardness using a hardness meter available from BYK-Gardner GmbH, Germany. This is a standard test and is well known to persons skilled in the art for determining the scratch resistance of a cured coating composition on a metal substrate.

Erichson Cup/Cup Sterilization This is a standard test known to persons skilled in the art, and is performed using a commercially available testing apparatus from Erichson GmbH and Co., Hemer, Germany.

Obviously, many modifications and variations of the invention as hereinbefore set forth can be made without departing from the spirit and scope thereof and, therefore, only such limitations should be imposed as are indicated by the appended claims.

What is claimed is:

1. A waterborne coating composition for application to a metal substrate comprising a blend of:
   (a) about 50% to about 90%, by weight of nonvolatile material, of an epoxy resin having an epoxy equivalent weight of about 5,000 to about 12,000;
   (b) about 10% to about 50%, by weight of nonvolatile material of a water-dispersible acrylic resin, said resin having carboxylic acid groups in an amount of about 3.5 to about 20 milliequivalents per gram of the resin;
   (c) a fugitive base in an amount sufficient to neutralize about 20% to about 200% of a stoichiometric amount of the carboxylic acid groups;
   (d) a sufficient amount of a carrier comprising water and volatile organic compounds, such that the waterborne coating composition contains about 10% to about 60%, by weight of the composition, of the total weight of (a), (b), (c), and such that the composition contains 450 grams or less of volatile organic compounds per kilogram of nonvolatile material; and
   (e) about 5% to about 30%, by weight of nonvolatile material, of a solid filler.

2. The composition of claim 1 wherein the composition is self-crosslinking and is free of an anhydride, a phenolic resin, an aminoplast, a carbodiimide compound, a melamine resin, a urea resin, a urea-formaldehyde compound, and mixtures thereof.

3. The composition of claim 1 wherein the epoxy resin has an epoxy equivalent weight of 5,500 to about 10,000.

4. The composition of claim 1 wherein the epoxy resin has a weight average molecular weight of about 10,000 to about 25,000.

5. The composition of claim 1 wherein the epoxy resin is a linear epoxy resin having an average of about 1.5 to about 2.5 epoxy groups per molecule of the epoxy resin.

6. The composition of claim 1 wherein the epoxy resin comprises an aromatic epoxy resin.

7. The composition of claim 1 wherein the acrylic resin comprises about 25% to about 75%, by weight of the acrylic resin, of an α, β-unsaturated carboxylic acid, and about 10% to about 60%, by weight of the acrylic resin, of an α, β-unsaturated ester.

8. The composition of claim 7 wherein the acrylic resin further comprises 0% to about 65%, by weight of the acrylic resin, of a vinyl monomer.

9. The composition of claim 7 wherein the α, β-unsaturated carboxylic acid is selected from the group consisting of acrylic acid, methacrylic acid, crotonic acid, itaconic acid, maleic acid, mesaconic acid, citraconic acid, fumaric acid, and mixtures thereof.

10. The composition of claim 7 wherein the α, β-unsaturated ester is selected from the group consisting of a $C_2$–$C_{12}$ alkyl acrylate, a $C_2$–$C_{12}$ alkyl methacrylate, a $C_2$–$C_{12}$ alkyl crotonate, a diester of an α, β-unsaturated dicarboxylic acid, and mixtures thereof.

11. The composition of claim 8 wherein the vinyl monomer is selected from the group consisting of styrene, ethylene, a halostyrene, isoprene, a conjugated butadiene, α-methylstyrene, vinyl toluene, vinyl naphthalene, vinyl chloride, acrylonitrile, acrylamide, methacrylamide, methacrylonitrile, vinyl acetate, vinyl propionate, vinyl stearate, isobutoxymethyl acrylamide, and mixtures thereof.

12. The composition of claim 1 wherein the acrylic resin comprises (a) ethyl acrylate, butyl acrylate, hydroxyethyl acrylate, hydroxyethyl methacrylate, styrene, methyl acrylate, methyl methacrylate, or mixtures thereof, and (b) acrylic acid, methacrylic acid, or mixtures thereof.

13. The composition of claim 1 wherein the acrylic resin has a weight average molecular weight of at least about 1,500.

14. The composition of claim 1 wherein the fugitive base is present in a sufficient amount to neutralize about 50% to about 175% of the stoichiometric amount of the carboxylic acid groups.

15. The composition of claim 1 wherein the fugitive base has sufficient volatility to be expelled from the composition during a curing process and is selected from the group consisting of ammonium hydroxide, a primary amine, a secondary amine, a tertiary amine, an alkanolamine, an alkylammonium hydroxide, an arylammonium hydroxide, and mixtures thereof.

16. The composition of claim 1 wherein the solid filler is present in an amount of about 5% to about 25%, by weight of nonvolatile material.

17. The composition of claim 1 wherein the solid filler is water insoluble and is selected from the group consisting of a metal oxide, an inorganic sulfate, an inorganic silicate, an inorganic phosphate, aluminum hydrate, a metallic pigment, an organic pigment, a polymeric micro void, and mixtures thereof.

18. The composition of claim 1 containing about 400 to 450 grams volatile organic compounds per kilogram of nonvolatile material.

19. The composition of claim 1 comprising a blend of:
(a) about 55% to about 85%, by weight of nonvolatile material, of epoxy resin having an epoxy equivalent weight of about 6,000 to about 9,000;
(b) about 15% to about 45%, by weight of nonvolatile material, of an acrylic resin comprising an $\alpha$, $\beta$-unsaturated acid and an $\alpha$, $\beta$-unsaturated ester;
(c) a fugitive base in an amount sufficient to neutralize about 75% to about 150% of the stoichiometric amount of the carboxylic acid groups;
(d) a sufficient amount of a carrier comprising water and volatile organic compounds, such that the waterborne coating composition contains about 15% to about 50%, by weight of the composition, of the total weight of (a), (b), and (c), and such that the composition contains about 350 to 450 grams of volatile organic compounds per kilogram of nonvolatile material;
(e) about 10% to about 25%, by weight of nonvolatile material, of a solid filler; and
(f) 0% to about 0.05%, by weight of nonvolatile material, of a formaldehyde-containing crosslinking agent.

* * * * *